US008023646B2

(12) United States Patent
Boyen

(10) Patent No.: US 8,023,646 B2
(45) Date of Patent: Sep. 20, 2011

(54) IDENTITY-BASED-ENCRYPTION EXTENSIONS FORMED USING MULTIPLE INSTANCES OF AN IDENTITY BASED ENCRYPTION SCHEME

(75) Inventor: Xavier Boyen, Mountain View, CA (US)

(73) Assignee: Voltage Security, Inc., Cupertino, CA (US)

( * ) Notice: Subject to any disclaimer, the term of this patent is extended or adjusted under 35 U.S.C. 154(b) by 871 days.

(21) Appl. No.: 11/983,154

(22) Filed: Nov. 6, 2007

(65) Prior Publication Data
US 2008/0263357 A1 Oct. 23, 2008

Related U.S. Application Data

(60) Provisional application No. 60/858,044, filed on Nov. 8, 2006.

(51) Int. Cl.
*H04L 9/30* (2006.01)
(52) U.S. Cl. .......................................... 380/30; 713/180
(58) Field of Classification Search .................... 380/37, 380/44–47; 713/180
See application file for complete search history.

(56) References Cited

U.S. PATENT DOCUMENTS

| 6,917,684 B1* | 7/2005 | Tatebayashi et al. ........... 380/44 |
| 2004/0179684 A1* | 9/2004 | Appenzeller et al. ........... 380/44 |
| 2004/0221160 A1* | 11/2004 | Douceur et al. .............. 713/176 |

OTHER PUBLICATIONS

Boneh et al. "Identity-Based Encryption from the Weil Pairing," SIAM Journal of Computing, 32(3):586-615, 2003.

Boneh et al. "Heirarchical Identity Based Encryption With Constant Size Ciphertext," Advances in Cryptology—Eurocrypt 2005, vol. 3494 of Lecture Notes in Computer Science, pp. 440-456, May 20, 2005.
Boneh et al. "Efficient Selective-ID Secure Identity Based Encryption Without Random Oracles," Advances in Cryptology—Eurocrypt 2005, vol. 3027 of Lecture Notes in Computer Science, pp. 223-238, Dec. 2004.
Abdalla et al. "Identity-Based Encryption Gone Wild," Proceedings of ICALP 2006, vol. 4051 of Lecture Notes in Computer Science, pp. 300-311, Dec. 3, 2006.
"An Efficient ID-KEM based on the Sakai-Kasahara Key Construction" [online]. Cryptology ePrint Archive, [retrieved on Nov. 6, 2011]: <URL: http://eprint.iacr.org/2005/224>.
"Secure and Practical Identity-Based Encryption" [online]. Cryptology ePrint Archive, [retrieved on Nov. 6, 2011]: <URL: http://eprint.iacr.org/2005/369>.

(Continued)

*Primary Examiner* — Gilberto Barron, Jr.
*Assistant Examiner* — Malcolm Cribbs
(74) *Attorney, Agent, or Firm* — Treyz Law Group; G. Victor Treyz; Nancy Y. Ru

(57) ABSTRACT

IBE extensions to IBE schemes may be provided by creating multiple instances of the same IBE scheme, where each instance has an associated IBE master key and corresponding IBE public parameters. During encryption, an IBE extension identity for each instance of the IBE scheme may be mapped to a corresponding component identity. A message may be encrypted using the component identities to create multiple ciphertexts. The ciphertexts can be combined and sent to a recipient. The recipient can request a private key. The private key may be generated by mapping the IBE extension identity into a component identity in each instance, by extracting private keys for each of the component identities, and by combining the private keys into a single IBE extension private key.

13 Claims, 11 Drawing Sheets

OTHER PUBLICATIONS

"ID Based Cryptosystems With Pairing on Elliptic Curve" [online]. Cryptology ePrint Archive, [retrieved on Nov. 6, 2011]: <URL: http://eprint.iacr.org/2003/054>.

Sahai, Amir et al. "Fuzzy Identity-Based Encryption." [online] Cryptology ePrint Archive 2004 [retrieved on Jun. 28, 2011]:<http://eprint.iacr.org/2004/086.pdf>.

* cited by examiner

IDENTITY-BASED-ENCRYPTION EXTENSIONS FORMED USING MULTIPLE INSTANCES OF AN IDENTITY BASED ENCRYPTION SCHEME

This patent application claims the benefit of provisional patent application No. 60/858,044, filed Nov. 8, 2006, which is hereby incorporated by reference herein in its entirety.

BACKGROUND OF THE INVENTION

This invention relates to cryptographic systems, and more particularly, to identity-based-encryption extensions of identity-based encryption schemes that support secure communications.

It is often desirable to encrypt sensitive electronic communications such as email messages. With symmetric key cryptographic arrangements, the sender of a message uses the same key to encrypt the message that the recipient of the message uses to decrypt the message. Symmetric key systems require that each sender and recipient exchange a shared key in a secure manner.

With public key cryptographic systems, two types of keys are used—public keys and private keys. Senders may encrypt messages using the public keys of recipients. Each recipient has a private key that is used to decrypt the messages for that recipient.

To ensure the authenticity of the public keys in traditional public key systems and thereby defeat possible man-in-the-middle attacks, public keys may be provided to senders with a certificate signed by a trusted certificate authority. The certificate may be used to verify that the public key belongs to the intended recipient of the sender's message. Public key encryption systems that use this type of traditional approach are said to use the public key infrastructure (PKI) and are referred to as PKI cryptographic systems.

Identity-based-encryption (IBE) public key cryptographic systems have also been proposed. As with PKI cryptographic systems, a sender in an IBE system may encrypt a message for a given recipient using the recipient's public key. The recipient may then decrypt the message using the recipient's corresponding private key. The recipient can obtain the private key from an IBE private key generator.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key. This allows a sender to create the IBE public key of a recipient by simply determining the recipient's identity.

Several practical IBE schemes have been demonstrated based on bilinear pairings. These bilinear-pairing-based IBE schemes fall into three classes: 1) full domain hash IBE, 2) exponent inversion IBE, and 3) commutative blinding IBE. Each of these classes of IBE scheme allows an identity-based public key to be used to encrypt data and allows a corresponding IBE private key to be used to decrypt data.

In some situations, it may be desirable to extend the capabilities of a basic IBE system. For example, in the context of the so-called Boneh-Franklin IBE scheme (which is an example of a full domain hash IBE system), a hierarchical IBE extension has been developed in which child private keys can be derived from parent private keys ("hierarchical IBE"). Another extension to the Boneh-Franklin IBE scheme that has been developed relates to dividing the IBE master secret into multiple shares ("threshold IBE"). In the context of the so-called Boneh-Boyen IBE scheme (which is an example of a commutative blinding IBE scheme), extensions have been developed for generating attribute-based private keys ("attribute-based IBE"), error-tolerant attribute-based private keys ("fuzzy IBE"), and private keys that can evolve forward, but not backward in time ("forward-secure IBE"). Threshold IBE and hierarchical IBE extensions to the Boneh-Boyen scheme have also been demonstrated.

The IBE extensions that have been proposed in recent years share a common goal of extending the notion of identity from its original atomic meaning (i.e., identity is indivisible and has no internal structures), to complex constructs of identity components on which certain operations can be performed. As described above, some proposed IBE extensions have known implementations. However, to temper this optimism, it should be noted that most of these extensions have been implemented in the context of only one IBE scheme (Boneh-Boyen), despite the availability of alternative IBE schemes on which to base IBE extensions. In particular, an entire family of very efficient IBE schemes (exponent inversion IBE schemes) has no previously known extensions.

It would therefore be desirable to be able to provide IBE extensions to the exponent inversion class of IBE schemes and to be able to generically construct IBE extensions for other IBE schemes.

SUMMARY

Identity-based-encryption (IBE) extensions to IBE schemes may be provided. At a private key generator, multiple instances of the same IBE scheme may be created. Each instance of the IBE scheme may have an associated IBE master key and corresponding IBE public parameters. All instances of the IBE public parameters may be published for use by message senders during encryption operations.

During encryption, for each instance of the IBE scheme, an IBE extension identity may be mapped to a corresponding component identity. A sender may encrypt a message by using each of the component identities in a corresponding instance of the IBE scheme to create multiple ciphertexts. The ciphertexts can be combined into a single ciphertext that is sent to a recipient.

The recipient of the ciphertext can request a private key. The private key may be generated by mapping the IBE extension identity into a component identity in each instance, by extracting private keys for each of the component identities, and by combining the private keys into a single IBE extension private key. The recipient can use the single IBE extension private key to decrypt the message.

IBE extensions may be created to IBE schemes such as the full domain hash IBE scheme, the exponent inversion IBE scheme, and the commutative blinding IBE scheme (as examples). IBE extensions to IBE schemes may include a hierarchical IBE extension, a fuzzy IBE extension, and an attribute-based extension (as examples).

Further features of the invention, its nature and various advantages will be more apparent from the accompanying drawings and the following detailed description.

DETAILED DESCRIPTION

Figure 1:
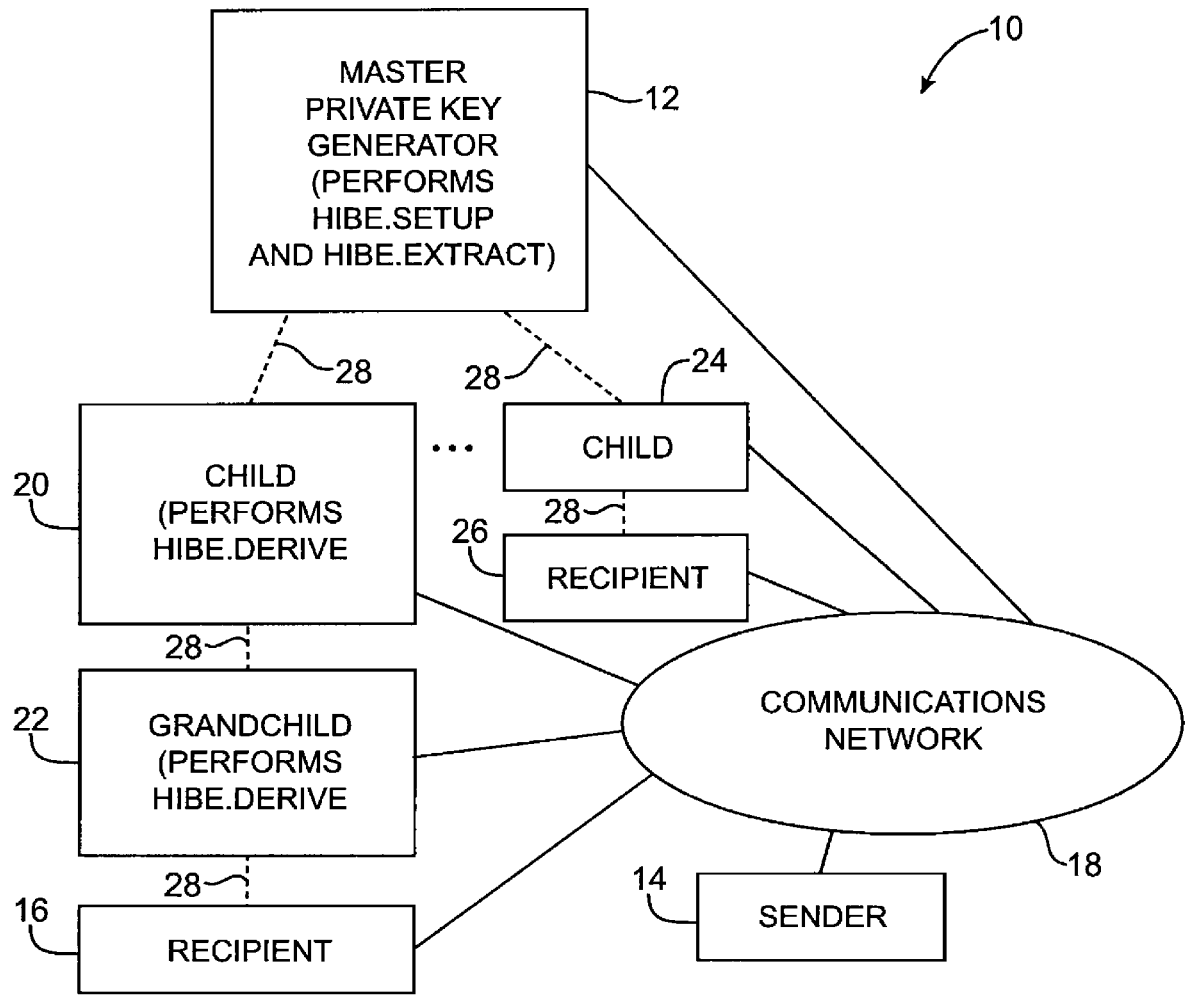
FIG. 1 is a schematic diagram of an illustrative system environment in which a hierarchical identity-based- encryption extension to an identity-based encryption scheme may be implemented in accordance with an embodiment of the present invention.

The three known classes of pairing-based IBE (full-domain hash, exponent inversion, and commutative blinding) define a general construction template by which encryption and key derivation are matched in an identity-based manner using a bilinear pairing. The one thing that these families have in common is their use of a pairing—but not how they use it. Indeed, the shape of the template greatly affects how the schemes can be extended, and their security proved.

Among the three classes, the commutative blinding method originated with Boneh-Boyen (Boneh et al. "Efficient Selective-ID Secure Identity Based Encryption Without Random Oracles," herein "$BB_1$-IBE," see, e.g., section four) has distinguished itself as the most fertile ground for generalizing IBE, based on the number of extensions that it currently supports (hierarchical IBE, attribute-based IBE, fuzzy IBE, forward-secure, etc.) It is followed rather distantly by the full-domain hash family, which contains fewer extensions (hierarchical IBE and forward-secure IBE). In contrast, the exponent inversion family does not have known extensions, despite the fact that the basic IBE functionality performs quite efficiently in this family.

In accordance with present invention, IBE extensions to the exponent inversion class of IBE scheme are provided. Methods for implementing IBE extensions in other IBE schemes are also provided.

Initially, an abstraction of an exponent inversion scheme is described that captures functional properties such as linearity in the exponent, and which is referred to as "linear IBE." Security properties that such schemes should satisfy depending on the final goal of the construction are also described. The security properties are associated with simultaneous or parallel instances of the IBE scheme running at once, which is a general technique used in the constructions of the present invention. This technique is used to transform any linear IBE scheme with suitable security properties into a hierarchical, fuzzy, attribute-based, or distributed IBE system, under generic security reductions to the underlying base IBE abstraction.

The transformations are syntactically black-box, but their security requires the parallel simulation of several base instances, hence the requirement that the underlying scheme be secure in such conditions. In general, the transformations preserve the security properties of the underlying scheme, e.g., in the random oracle or standard model, and under selective or adaptive security, but keeping in mind that it requires (and consumes) the supplemental notion of parallel IBE security already mentioned. The method preserves the efficiency of the underlying scheme, with a multiplier that depends on the particulars of what the transformation seeks to achieve.

Public-key systems that support private sub-keys with designated restricted capabilities are sometimes referred to herein as ad-hoc cryptosystems. This includes all three known classes of pairing-based IBE schemes and their extensions.

Pairing-based identity-based encryption schemes can be classified as described below. These IBE support at least a basic security reduction to a well-formulated complexity assumption, either in the standard model or in the random oracle model.

"Full Domain Hash" IBE

This is the class of the Boneh-Franklin identity-based encryption scheme.

In the Boneh-Franklin scheme and the constructions that are based on it, session keys are of the form $e(H(Id), \hat{g}^\alpha)^s$ where Id is the recipient identity, $\alpha$ is the master secret, and H is a full-domain hash function into the bilinear group, viewed as a random oracle. In SOK key exchange, the session key $e(H(Id_A), H(Id_B)^\alpha)^s$ is computed interactively from the identities of both parties, but also involves the master key $\alpha$ and a random oracle as in Boneh-Franklin encryption.

"Exponent Inversion" IBE

For this type of IBE scheme, the principle is to obtain a session key of the form $e(g, \hat{g})^s$ based on a ciphertext $(g^{f(Id)})^s$ and a private key $g^{1/f(Id)}$, where f(Id) is a secret function of the recipient identity but $g^{f(Id)}$ is computable publicly. A benefit of this type of construction is that there is no need to hash directly on the curve over which the bilinear pairing function $e(g, \hat{g})^s$ is realized. Notice also that the master key cancels out completely from the session key.

The exponent inversion category includes the Sakai-Kasahara scheme originally described in Sakai et al. "ID Based Cryptosystems With Pairing Over Elliptic Curve" and later proven secure in Chen et al. "An Efficient ID-KEM based on the Sakai-Kasahara Key Construction" in the random oracle model. This category also includes the second of two IBE schemes proposed by Boneh and Boyen. See, for example, section 5 of Boneh et al. "Efficient selective-ID Secure Identity Based Encryption Without Random Oracles" (herein "$BB_2$"), which has a selective-identity proof of security in the standard model. These schemes rely on the fairly strong BDHI complexity assumption in Boneh et al. "Efficient selective-ID Secure Identity Based Encryption Without Random Oracles," which was first used in another context by Mitsunary, Sakai, and Kasahara in "A New Traitor Tracing." This assumption, called Bilinear Diffie-Hellman Inversion (BDHI), has been further analyzed in Cheon "Security Analysis of the Strong Diffie-Hellman Problem."

Recently, Gentry in "Practical Identity-Based Encryption Scheme without random oracles" proposed another construction that has superficial similarities to the others in this category, but with a proof of security in the adaptive-identity model (based on an even stronger assumption). Gentry's IBE scheme appears to belong in the exponent inversion category, although the case is not clear-cut because the session key is not of the form $e(g, ĝ)^s$, but of the form $e(g, ĥ)^s$, where ĥ is created by the initial setup procedure. Although ĥ remains statistically independent of the secret key, it is not intended to be constant from one instance of the system to the next, and Gentry's security proof no longer applies if ĥ and thus $e(g, ĥ)$ is fixed.

"Commutative Blinding" IBE

The last category of IBE scheme descends from Boneh-Boyen in section 4 of Boneh et al. "Efficient Selective-ID Secure Identity Based Encryption Without Random Articles" (herein "$BB_1$"). These systems are based on the same BDH assumption as the Boneh-Franklin scheme in Boneh et al. "Identity-Based Encryption from the Weil Pairing," but use a mechanism that avoids random oracles. The general principle is to create blinding factors from two secret coefficients in a way that makes them "commute" (i.e., not depend on the application order), thanks to the pairing.

The algebraic versatility exhibited by the $BB_1$ approach has given rise to a number of extensions to the original scheme. Virtually all constructions in the commutative blinding paradigm have session keys of the form $e(g, ĝ^\alpha)^s$, where $\alpha$ is part of the master key, and s is chosen by the sender.

It is possible that additional families of IBE scheme will be developed in the future. For clarity, we describe IBE extensions based on the Exponent Inversion family, which tends to be the most computationally efficient and arguably requires the least bandwidth, but currently lacks the flexibility of the other pairing-based families (such as commutative blinding especially). However, the methods described herein may also be used to extend other pairing-based IBE schemes if desired.

Exponent Inversion Abstractions

An abstraction of IBE that captures the properties of the exponent inversion paradigm that is required is now described. This abstraction is sufficiently powerful to support a wide variety of generic constructions, and sufficiently general to encompass all IBE schemes known to date that do not fall outside of the exponent inversion paradigm.

Linear IBE Schemes

Based on the properties that the semi-generic construction will require, the following abstraction of IBE schemes that use the exponent inversion principle is defined. The $BB_2$ scheme described above fits particularly nicely within this abstraction.

Intuitively, two facets of the "linearity" exhibited by the exponent inversion IBE scheme may be exploited. All such schemes construct their identity-based trapdoor from a secret polynomial $\theta(Id)$, and publish enough information to allow anyone to compute $g^{\theta(Id)}$ but not $ĝ^{1/\theta(Id)}$. The latter can serve as a private key corresponding to identity Id. The trapdoor arises from the cancellation of the exponents on both sides of the pairing: $e(g^{\theta(Id)}, ĝ^{1/\theta(Id)}) = e(g, ĝ)$. To implement an IBE scheme, the encryptor must pick a randomization exponent s; the ciphertext becomes $g^{\theta(Id)s}$ and the session key $e(g, ĝ)^s$. Because session keys constructed this way are linear in both the private key and the ciphertext, it will be straightforward to construct secret sharing schemes in the exponent either in the ciphertext or on the private key side. This is the first property that is needed and it will be made more precise and will be generalized below.

The second property that is needed is the independence of session keys with respect to the master secret. As in any IBE scheme, the master secret is needed to construct private keys, but here it need not affect the choice of session keys. Indeed, if the generators g and ĝ are imposed externally, the only degree of freedom in the session key $e(g, ĝ)^s$ is the exponent s chosen by the encryptor. (This is very much unlike full-domain hash and commutative blinding IBE schemes, in which session keys are respectively of the form $e(H(Id), ĝ^\alpha)^s$ and $e(g, ĝ^\alpha)^s$ and necessarily involve the master key $\alpha$.)

As already mentioned, Gentry's IBE scheme uses session keys of the form $e(g, ĥ)^s$ rather than $e(g, ĝ)^s$, where ĥ is created at random by the initial setup procedure. Although our template requires ĥ to be fixed, the current proof of Gentry's IBE does not tolerate it, and so we provisionally include Gentry-IBE as a "syntactic" linear IBE scheme until the question can be settled.

A Template For Exponent Inversion IBE

Toward formalizing the requirements above, we first define the particular template that candidate IBE schemes must obey.

Setup (e, g, ĝ, v, w) on input a pairing e: $G \times Ĝ \rightarrow G_t$, generators $g \in G$, $ĝ \in Ĝ$, $v \in G_t$, and a random seed w, outputs a master key pair (Msk, Pub=(e, g, ĝ, v, ... )).

We require key pairs generated from independent random seeds $w_1, w_2, \ldots$ to be mutually independent. We allow key pairs generated from the same inputs e, g, ĝ, v, w to be mutually independent, as the setup algorithm is permitted to use its own source of randomness.

Extract (Msk, Id) on input Msk and an identity Id, outputs a private key $Pvk_{Id} = (Id, R, d)$, which can be deterministic or randomized.

Here, Id∈Id, the domain of identities; R∈Rd, some non-empty auxiliary domain; and $d = (d_1, \ldots, d_n) \in D$, a vector space of n coordinates, each a copy of one of $F_p$, G, Ĝ, $G_t$.

Encrypt (Pub, Id, Msg, s) on input Pub, a recipient Id, a plaintext Msg, and a randomization exponent $s \in F_p$, outputs a ciphertext $Ctx = (Id, S, c_0, c)$.

Here, we require that $Msg \in G_t$, that $c_0 = Msg \cdot v^s$, and that $c = (c_1, \ldots, c_m) \in C$, where C is a vector space of m coordinates, each being a copy of $F_p$, G, Ĝ, or $G_t$. Finally, we assume that S∈Sd, with Sd some non-empty auxiliary domain.

Decrypt (Pub, $Pvk_{Id}$, Ctx) on input Pub, a private key $Pvk_{Id} = (Id, R, d)$, and a ciphertext $Ctx = (Id, S, Msg \cdot v^s, c)$, outputs Msg provided the inputs are well-formed and the identities match.

The purpose of w given to setup is to allow the creation of multiple instances of a single scheme with related keys; this may enable certain schemes (potentially Gentry's) to fit the template, provided that other security conditions are met. Normally, w is ignored by the underlying scheme and all key pairs are independent.

Based on this template, we define the notion of linear IBE to capture the intuitive linearity properties of the session keys that we discussed.

Definition 1

A linear IBE scheme is a quadruple of algorithms Setup, Extract, Encrypt, and Decrypt that follows the template above, and further satisfies the two properties below.

1. There exists a (publicly) efficiently computable function, $f_{pub}$: Id*Rd*Sd*C*D→$G_t$, linear in each of its last two arguments, such that, for all well-formed $Pvk_{Id}$=(Id, R, d) and Ctx=(Id, S, $c_0$, c), $$f_{Pub}(Id, R, S, c, d) = v^{-s}$$

where we recall that v is the generator of $G_t$ given as input to the Setup function, and thus independent of the choice of Msk.

Note that the decryption algorithm reduces to: Decrypt ($Pvk_{Id}$, Ctx)←$c_0$*$f_{Pub}$(Id, R, S, c, d).

2. For any two possibly identical public keys $Pub_1$ and $Pub_2$ derived from the same parameters (e, g, ĝ, v, w), for any auxiliary values $R'_1$ and $R'_2$, and for any identities $Id_1$ and $Id_2$ such that $Pub_1 \neq Pub_2 \lor Id_1 \neq Id_2$, one can publicly and efficiently find two "reciprocal private keys" $d'_1=(d'_{1,1}, \ldots, d'_{1,n})$ and $d'_2=(d'_{2,1}, \ldots, d'_{2,n})$ such that:

(a) For i, j=1, 2, let $[d_{ij}: (Id_j, R, d_{ij})$←Extract ($Msk_j$, $Id_j$) |$R=R_i$] be the conditional distribution induced by sampling the extraction algorithm and retaining outcomes with the stated auxiliary value $R_i$. There must exist a non-trivial linear combination with coefficients $t_{ij} \in F_p$, allowed to depend on the $R_i$ and $R'_j$, that renders these random variables statistically indistinguishable, $$[d'_1] \sim [(d_{11})^{t11}(d_{12})^{t12}]$$

$$[d'_2] \sim [(d_{21})^{t21}(d_{22})^{t22}]$$

(b) For any two well-formed ciphertexts for $Id_1$ and $Id_2$ that have the same exponent s, written $Ctx_1=(Id_1, S_1, Msg_1*v^s, c_1)$ and $Ctx_2=(Id_2, S_2, Msg_2*v^s, c_2)$, we have, $$f_{Pub}(Id_1, R'_1, S_1, c_1, d'_1) * f_{Pub}(Id_2, R'_2, S_2, c_2, d'_2) = v^0 = 1$$

Property 1 expresses our two earlier requirements: first, that the session keys be bilinear functions of both the private keys and the ciphertexts (represented by c and d); and second, that session keys be of the form $v^{-s}$ for externally fixed v, and thus independent of the master key.

Property 2 asks that anyone be able to produce $d'_1$ and $d'_2$ that cancel out when used as private keys. The private keys $Pvk_1$ and $Pvk_2$ and the linear coefficients $t_{11}, \ldots, t_{22}$ must provably exist, but they need not and should not be efficiently computable from public information (as this would be incompatible with IBE security). Requirement 2a serves to ensure that $d'_1$ and $d'_2$ are properly randomized and compatible with the function $f_{Pub}$. Requirement 2b implies a generalization to arbitrary linear combinations of keys $d'_1, \ldots, d'_k$ for any number k of identities (and auxiliary values): cancellation would then occur in a k-wise product under the chosen linear combination. We shall see this in action in the Hierarchical IBE extension below.

Parallel IBE Security

The preceding notion of linear IBE must be strengthened slightly in order to be useful. What we need is a weak notion of parallelism for the IBE scheme that extends to the simulation proofs, but that does not necessarily entail full concurrency.

Essentially, we want the ability to run multiple instances of the IBE at once, in a way that the session keys are all the same (though the identities might be different). For this, we need all the instances to use the same target group generator $v \in G_t$ (which need not be specified externally), and allow them to use the same random exponents to create the common session key $v^s$.

We define the notion of parallel semantic security under selective-identity chosen plaintext attack using the following game played against an attacker A.

Target: A announces the identities $Id^*_1, \ldots, Id^*_l$ it intends to attack.

Setup: The challenger generates a set of public bilinear parameters (e, g, ĝ, v) and a secret random seed w, and makes l independent calls to the IBE setup algorithm ($Msk_i$, $Pub_i$)←Setup (e, g, ĝ, v, w) using these inputs, but with different internal randomness if Setup uses any. A is given (e, g, ĝ, v) and the l public keys $Pub_1, \ldots, Pub_l$, which may or may not be the same.

Queries I: A adaptively submits private key extraction queries on each IBE scheme. For any query Id made with respect to the i-th IBE public key $Pub_i$, we require that $Id \neq Id^*_i$. The challenger answers such a query with $Pvk_{Id,i}$←Extract ($Msk_i$, Id), recalling $Pvk_{Id,i}$ from storage if it has been computed already.

Challenge: A then outputs two messages $Msg_1$ and $Msg_2$ on which it wishes to be challenged. The challenger selects b∈{1, 2} at random, draws a random exponent s∈$F_p$, and creates l ciphertexts $Ctx_i$←Encrypt ($Pub_i$, $Id^*_i$, $Msg_b$, s) using the same message $Msg_b$. The challenge given to A is the l ciphertexts $Ctx_1, \ldots, Ctx_l$.

Queries II: A makes additional queries under the same constraints as before, to which the challenger responds as before. The total number of queries to each IBE subsystem in phases I and II may not exceed q.

Guess: A eventually outputs a guess b'∈{1, 2}, and wins the game if b'=b.

We say that an IBE scheme is (q, l, τ, ε)-Par-IND-sID-CPA secure if there is no adversary A that wins the preceding game in time τ with probability at least ½+ε.

We say that an IBE scheme is (q, l, τ, ε)-Par-IND-ID-CPA secure in the same conditions, if the Target phase is moved to the beginning of the Challenge phase.

We further strengthen the security notion by offering an additional type of key extraction query, which captures the intuition that the challenger is able to create linear relations between arbitrary private keys, including the ones on the target identities (albeit without revealing what those are). We define this security property separately because it is not needed for all generic constructions. In Query phases I and II, we add a "parallel simulation" query, which goes as follows:

Queries I' & II': A can make adaptive "parallel simulation" queries across all IBE instances. To query, A outputs k+1 pairs ($i_j$, $Id_{ij}$) where $\{i_0, \ldots, i_k\}$ is a subset of $\{1, \ldots, l\}$. We require $Id_{ij} \neq Id^*_{ij}$ for j=1, \ldots, k but allow $Id_{i0}=Id^*_{i0}$. To respond, B picks a random $\gamma \in_s F^x_p$; for j=0, \ldots, k, it computes $Pvk_{ij}=(Id_{ij}, R_{ij}, d_{ij})$←Extract ($Msk_{ij}$, $Id_{ij}$), or recalls it from storage if it was computed before; it then outputs ($Id_{ij}$, $R_{ij}$, $(d_{ij})^\gamma$) for j=0, \ldots, k.

Each new needed call to Extract counts toward the quota of q private key queries; no $Pvk_{Id,i}$ is ever recomputed under different randomizations.

The above game augmented with the "parallel simulation" query defines the following security notion.

We say that an IBE scheme is (q, l, τ, ε)-ParSim-IND-sID-CPA secure if there is no adversary A that wins the augmented game in time τ with probability at least ½+ε.

We similarly define adaptive-identity (q, l, τ, ε)-ParSim-IND-ID-CPA security, if the Target phase is postponed to the beginning of the Challenge phase.

We short-handedly say that an IBE scheme is Exponent Inversion Compliant (or EI-compliant) if it satisfies Definitions 1 and 3, and thus 2 (with parameters that are understood from context).

Concrete Instantiations

We next prove that the canonical examples of IBE schemes that intuitively fall under the exponent inversion umbrella are, indeed, linear IBE schemes per our formal definition, and also fulfill the parallel simulation IBE security property (albeit in different ways). For completeness, the workings of each scheme are reviewed below.

$BB_2$-IBE

Our first example is the second of two IBE constructions given by Boneh and Boyen in "Efficient selective-ID Secure Identity Based Encryption Without Random Oracles," or $BB_2$. It was originally proven secure against selective-identity attacks from the BDHI assumption in Misunari et al. "A New Traitor Tracing" and Boneh et al. "Efficient Selective-ID Secure Identity Based Encryption Without Random Oracles" in the standard model.

$BB_2$.Setup outputs Msk←(a, b) and Pub←(g, $g_a=g^a$, $g_b=g^b$, v=e(g, ĝ)) for a, b$\in_s F_p$.

$BB_2$.Extract (Msk, Id) outputs $Pvk_{Id}$←($r_{Id}$=r, $d_{Id}$=$ĝ^{(-1/(a+Id+br))}$) for r$\in_s F_p$.

$BB_2$.Encrypt (Pub, Id, Msg, s) outputs Ctx←($c_0$=Msg*$v^s$, $c_1=(g_a g^{Id})^s$, $c_2=g^s_b$).

$BB_2$.Decrypt (Pub, $Pvk_{Id}$, Ctx) outputs Msg'←($c_0$*e $(c_1 c_2^{r_{Id}}, d_{Id})\in G_t$.

Note that the setup seed w is not used; the master key (a, b) is generated from internal randomness.

SK-IBE

The second scheme we describe is adapted from the identity-based key encapsulation mechanism (IBKEM) given in Chen et al. "An Efficient ID-KEM based on the Sakai-Kasahara Key Construction" and attributed to Sakai and Kasahara "ID Based Cryptosystems With Pairing Over Elliptic Curve." Its security proof is set in the random oracle model. For consistency with our definitions, we present an IBE version of the scheme, and call it SK.

SK.Setup outputs Msk←a$\in_s F_p$ and Pub←(g, $g_a=g^a$, v=e(g, ĝ), H: $\{0,1\}^* \to F_p$).

SK.Extract (Msk, Id) outputs $Pvk_{Id} \leftarrow ĝ^{(1/(a+H(Id)))}$.

SK.Encrypt (Pub, Id, Msg, s) outputs Ctx←($c_0$=Msg*$v^s$, $c_1=(g_a g^{H(Id)})^s$).

SK.Decrypt (Pub, $Pvk_{Id}$, Ctx) outputs Msg'←$c_0/e(c_1, Pvk_{Id})\in G_t$.

As in $BB_2$, the setup seed w is not used; the master key a is generated from internal randomness.

Generic Constructions

Take any abstract scheme IBE=(IBE.Setup, IBE.Extract, IBE.Encrypt, IBE.Decrypt) with "parallel" semantic security against selective-identity chosen-plaintext attacks, that has an appropriate linear structure as above. We show how to turn it into generalizations of IBE that are semantically secure against (the appropriate notion of) selective-identity chosen-plaintext attacks.

Hierarchical Identities

A hierarchical IBE extension to the exponent inversion IBE scheme may now be provided. In the hierarchical IBE extension (HIBE) in Horwitz et al. "Towards Hierarchical Identity-Based Encryption" and Gentry et al. "Hierarchical ID-Based Cryptography," identities are arranged in a hierarchy, and the private keys can be derived per the hierarchy without involving the global master secret. HIBE is essentially a delegation mechanism with a single root (the private key generator). We construct such a scheme generically as follows.

HIBE.Setup (L)

Given a security parameter and the desired number L of levels in the hierarchy:

1. Create bilinear group parameters, e, g, ĝ, v, at the desired level of security. Also pick an ephemeral shared random seed w which is kept secret.

2. Generate L sets of IBE master key pairs with common bilinear parameters, e, g, ĝ, v, by running L instances ($IBE.Msk_i$, $IBE.Pub_i$)←IBE.Setup (e, g, ĝ, v, w) for i=1, . . . , L.

3. Select L collision-resistant hash functions (or UOWHFs) from vectors of IBE identities to single identities, $H_i: I^i \to I$ for i=1, . . . , L, where I is the domain of IBE identities.

4. Output the HIBE master key pair: HIBE.Msk=($IBE.Msk_1$, . . . , $IBE.Msk_L$) as the HIBE master key, HIBE.Pub=($IBE.Pub_1$, . . . , $IBE.Pub_L$, $H_1$, . . . , $H_L$) as the HIBE public key.

HIBE.Extract (Msk, Id)

Given HIBE.Msk and a target identity Id=($I_1$, . . . , $I_l$) at level l≤L:

1. For each i=1, . . . , l, let $h_i=H_i(I_1, \ldots, I_i)$ be the hash of the first i components.

2. For each i=1, . . . , l, extract an IBE private key ($h_i$, $R_i$, $d_i$)←Extract ($IBE.Msk_i$, $h_i$).

3. Select $r_1, \ldots, r_l \in F_p$ under the constraint that $\Sigma_{i=1,\ldots,l} r_i = 1$ (mod p).

4. Output the HIBE private key: $HIBE.Pvk_{Id}=((I_1, R_1, d_1^{r_1}), \ldots, (I_l, R_l, d_l^{r_l}))$.

Observe that all the components of the private key are bound to each other via the constraint $\Sigma_{i=1,\ldots,l} r_i = 1$ (mod p). Without it, the key would be utterly random and therefore useless. The mutual binding of the components also ensures that private keys given to different users are impervious to collusion attacks.

HIBE.Derive ($PvkId$, I')

Given $HIBE.Pvk_{Id}$ for an l-level HIBE "parent" identity Id with l<L, and an IBE identity I' to act as the (l+1)-th component of the HIBE "child" identity:

1. Decompose $HIBE.Pvk_{Id}$ as a list of triples ($I_i$, $R_i$, $d_i$) for i=1, . . . , l. Let also $I_{l+1}$=I'.

2. For each i=1, . . . , l+1, let $h_i=Hi(I_1, \ldots, I_i)$ be the hash of the first i components.

3. For each i=1, . . . , l:

(a) Find two vectors $d'_{1,i}$ and $d'_{2,i}$ that satisfy Property 2 for $Id_1=h_i$ and $Id_2=h_{i+1}$ (and the auxiliary $R_i$ and $R_{i+1}$) relative to the public keys $IBE.Pub_i$ and $IBE.Pub_{i+1}$.

(b) Select $r_i \in F_p^*$ and observe that $(d'_{1,i})^{r_i}$ and $(d'_{2,i})^{r_i}$ also satisfy Property 2.

4. For i=1, . . . , l+1, define $d''_i=(d'_{1,1})^{r_1}$ if i=1, $(d'_{2,i-1})^{r_{i-1}} (d'_{1,i})^{r_i}$ if 2≤i≤l, and $(d'_{2,l})^{r_l}$ if i=l+1.

5. Output the HIBE private key:

$HIBE.Pvk_{Id}=((I_1, R_1, d_1*d''_1), \ldots, (I_l, R_l, d_l*d''_l), (I_{l+1}, R_{l+1}, d''_{l+1}))$.

Notice that the derived private key is fully randomized (its distribution is the same as if it had been created by HIBE.Extract), it will decrypt correctly (because of Property 2), and its creation required only the parent private key and not the master key.

HIBE.Encrypt (Pub, Id, Msg)

Given HIBE.Pub, an l-level identity Id=($I_1$, . . . , $I_l$) where l≤L, and a message Msg$\in G_t$:

1. Pick a random exponent s$\in F_p$.

2. $\forall$i=1, . . . , l, let $h_i=H_i(I_1, \ldots, I_i)$ be the hash of the first i components.

3. $\forall$i=1, . . . , l, build an IBE ciphertext $Ctx_i=(h_i, Si, c_0, c_i)$←Encrypt ($IBE.Pub_i$, $h_i$, Msg, s).

4. Output the HIBE ciphertext: $HIBE.Ctx=((h_1, \ldots, h_l), c_0, (S_1, S_l), (c_1, \ldots, c_l))$.

Notice that $c_0=Msg*v^s$ is the same in all the IBE ciphertexts.

HIBE.Decrypt (Pub, PvkId, Ctx)

Given HIBE.Pub, a private key $Pvk_{Id}=(Pvk_1, \ldots, Pvk_l)$, and a ciphertext $Ctx=((h_1, \ldots, h_l), c_0, (S_1, \ldots, S_l), (c_1, \ldots, c_l))$ for matching l-level identities:

1. $\forall i=1, \ldots, l$, assemble $Ctx_i=(h_i, 1, S_i, c_i)$, using $1 \in G_t$ in lieu of $c_0$.

2. $\forall i=1, \ldots, l$, compute the IBE decryption $v_i \leftarrow$ IBE.Decrypt (IBE.Pub$_i$, Pvk$_i$, Ctx$_i$).

3. Output the decrypted plaintext: $Msg=c_0*\Pi_{i=1,\ldots,l} v_i$.

By Property 1, we know that $v_i=v^{-s(ri)}$ provided that the algorithm inputs are as expected. Since $\Pi_i r_i=1$, we obtain the desired result.

The collision-resistant hash functions $H_1, \ldots, H_L$ serve to enforce the "inheritance" requirement that identity components of higher index be dependent on the components of lower index. The hash functions do this by creating a precedence ordering over the indices in a construction that would otherwise be indifferent to it. The schemes we build next have no such requirement.

The above construction is quite efficient. If we instantiate it using $BB_2$ or SK, we respectively obtain two HIBE systems that only require l pairings for decryption at level l, which is marginally faster than most previously known HIBE systems in Gentry et al. "Hierarchical ID-Based Cryptography," Boneh et al. "Efficient Selective-ID Secure Identity Based Encryption Without Random Oracles," and Boneh et al. "Hierarchical Identity Based Encryption With Constant Size Ciphertext." The specialized construction from Boneh et al. "Hierarchical Identity Based Encryption With Constant Size Ciphertext" offers faster decryption for identities of depth $l \geq 3$.

We can prove selective-identity security of the scheme if the underlying scheme meets the weaker version of "parallel" selective-identity IBE security (from Definition 2).

Fuzzy Identities

A fuzzy IBE extension to the exponent inversion IBE scheme may now be provided. In the fuzzy IBE extension in "fuzzy identity-based encryption," private keys and ciphertexts pertain to multiple identities (or attributes) at once, and decryption is predicated on meeting certain threshold of matching attributes. The collusion resistance property stipulates that private keys containing different sets of attributes cannot be combined to obtain a larger set than any of them provided by itself.

Two versions of the primitive are defined in "fuzzy identity-based encryption": a "small universe" version which supports an enumerated set of possible attributes, and a "large universe" version, where exponentially many attributes are representable but only a constant number at a time. In both versions the attributes are Boolean (either present or absent), which we call "small domain."

Here, we give a "large domain" generalization of "small universe" fuzzy IBE, where the enumerated attributes are now key/value pairs that range in all of $F_p$. This could be useful in applications of fuzzy IBE that require non-Boolean attributes, such as a biometric system with attributes such as the height of a person.

The small-universe, large-domain, generic fuzzy IBE construction is as follows.

FuzzyIBE.Setup (n)

Given a security parameter and the number n of attribute types to support:

1. Create bilinear group parameters, e, g, ĝ, v, at the desired level of security, and a secret random string w.

2. Generate n independent IBE master key pairs with shared bilinear parameters, e, g, ĝ, v, by executing (IBE.Msk$_i$, IBE.Pub$_i$)←IBE.Setup (e, g, ĝ, v, w) for $i=1, \ldots, n$.

3. Output the fuzzy IBE master key pair: FuzzyIBE.Msk= (IBE.Msk$_1$, \ldots, IBE.Msk$_n$) as the fuzzy IBE master secret, and FuzzyIBE.Pub=(IBE.Pub$_1$, \ldots, IBE.Pub$_n$) as the fuzzy IBE public parameters.

FuzzyIBE.Extract (Msk, Id, t)

On input a master key FuzzyIBE.Msk, a vector $Id=(I_1, \ldots, I_n)$ of (positionally sensitive) attributes $I_i \in F_p$, and a threshold parameter t with $1 \leq t \leq n$:

1. Pick $f_1, \ldots, f_{t-1} \in F_p$ and let $f(x)=1+\Sigma_{i=1,\ldots,t-1} f_i x^i$ of degree $t-1$. Note that $f(0)=1$ 2. For all $i=1, \ldots, n$, extract an IBE private key ($I_i, R_i, d_i$)←Extract (IBE.Msk$_i$, $I_i$)

3. Output the fuzzy IBE private key: FuzzyIBE.Pvk$_{Id}$=(t, $(I_1, R_1, d_1^{f(1)}), \ldots, (I_n, R_n, d_n^{f(n)})$)

FuzzyIBE.Encrypt (Pub, Id, Msg)

On input a public key FuzzyIBE.Pub, a vector $Id=(I_1, \ldots, I_n)$ of (positionally sensitive) attributes $I_i \in F_p$, and a message $Msg \in G_t$:

1. Pick a random exponent $s \in F_p$

2. $\forall i=1, \ldots, n$, build a IBE ciphertext $Ctx_i=(I_i, S_i, c_0, c_i)$←Encrypt (IBE.Pub$_i$, $I_i$, Msg, s)

3. Output the fuzzy IBE ciphertext (using $c_0=Msg*v^s$ common to all IBE ciphertexts): FuzzyIBE.Ctx=(Id, $c_0$, $(S_1, \ldots, S_n), (c_1, \ldots, c_n)$)

FuzzyIBE.Decrypt (Pub, PvkId, Ctx)

Given FuzzyIBE.Pub, a private key Pvk$_{Id}$, and a ciphertext Ctx:

1. Determine t attributes $I_{i1}, \ldots, I_{it}$ that appear in both Pvk$_{Id}$ and Ctx in matching positions.

(a) If there are fewer than t "key/value" matches, then output $\perp$ and halt.

(b) Else, select any t matching attributes $I_{i1}, \ldots, I_{it}$ and define $T=\{i_1, \ldots, i_t\}$.

2. For $j=1, \ldots, t$:

(a) Extract the IBE private key ($I_{ij}, R_{ij}, d_{ij}$) from Pvk$_{Id}$ and call it Pvk$_j$.

(b) Assemble the IBE ciphertext ($I_{ij}, 1, S_{ij}, c_{ij}$) from Ctx and call it Ctx$_j$.

(c) Let $\Lambda_{T,i}(x)=\Pi_{i' \in T \setminus \{i\}}((x-i')/(i-i'))$ be the Lagrange interpolation coefficients from T to x.

(d) Compute the IBE decryption $v_j \leftarrow$ IBE.Decrypt (IBE.Pub$_j$, Pvk$_j$, Ctx$_j$).

3. Output the plaintext: $Msg=c_0*\Pi_{(j=1,\ldots,t)} v_j^{[\Lambda(T,ij)(0)]}$.

By Property 1, we know that $v_j=v^{-s\,f(ij)}$ if the inputs to the algorithm are as expected. The result follows by using Lagrange polynomial interpolation, $\Pi_j f(i_j) \Lambda_{T,ij}(0)=f(0)=1$, "in the exponent."

The efficiency of the scheme is comparable to that of (the "small universe" version of) "fuzzy identity-based encryption" when instantiated with $BB_2$, even though this is a "large domain" construction.

Attribute-Based Encryption

An Attribute-Based IBE extension to the exponent inversion IBE scheme may be provided. Attribute-based encryption (ABE) is a powerful generalization of fuzzy IBE that was recently proposed in Goyal et al. "Attribute-Based Encryption for Fine-Grained Access Control of Encrypted Data." Instead of allowing decryption conditionally on the satisfaction of a single threshold gate (whose inputs are the matching attributes in the ciphertext and the key), ABE allows the condition to be defined by a tree of threshold gates.

The fuzzy IBE construction can be further extended into a generic private-key policy attribute-based encryption (KP-ABE) scheme in Goyal et al. "Attribute-Based Encryption for Fine-Grained Access Control of Encrypted Data," where the attributes are key/value pairs ("large domain") rather than Boolean.

Both fuzzy IBE and KP-ABE are based on the implementation of an access policy in the private keys given to the users. Whereas in fuzzy IBE the access policy is a single t-out-of-n threshold gate, in KP-ABE it can comprise many threshold gates arranged in a tree. Notice that conjunctions and disjunctions are special cases of threshold gate with t=n and t=1 respectively. A fairly large variety of policies can be encoded compactly using such an access structure. The generic construction is as follows.

kpABE.Setup (n)

Given a security parameter, and the total number N of attributes to support:

1. Create bilinear group parameters, $e, g, \hat{g}, v$, at the desired level of security.
2. Generate N independent IBE master key pairs for the same bilinear parameters, $e, g, \hat{g}, v$, from N executions (IBE.Msk$_i$, IBE.Pub$_i$)←IBE.Setup ($e, g, \hat{g}, v$) for i=1, ..., N.
3. Output the KP-ABE master key pair: kpABE.Msk= (IBE.Msk$_1$, ..., IBE.Msk$_N$) as the KP-ABE master secret and kpABE.Pub=(IBE.Pub$_1$, ..., IBE.Pub$_N$) as the KP-ABE public parameters.

kpABE.Extract (Msk, Id, T)

The inputs are the master key, a vector Id=($I_1$, ..., $I_N$) of attribute values $I_i \in F_p$, and a policy T.

The policy is represented as a tree T, whose interior nodes are threshold gates with multiple Boolean inputs and a single (non-duplicated) Boolean output, and whose N leaf nodes are comparison gates that test equality of each input attribute to the respective target value $I_i$.

The private key should enable its owner to decrypt a ciphertext encrypted for Id'=($I'_1$, ..., $I'_N$) if and only if $T_{I_1, ..., I_N}$ ($I'_1$, ..., $I'_N$) evaluates to true. The key is constructed recursively using a similar method as in Goyal et al. "Attribute-Based Encryption for Fine-Grained Access Control of Encrypted Data," as follows.

1. Give each node of T a unique index in $F_p$ (use 0 for the root and 1, ..., N for the leaves).
2. Visit all interior nodes in a top-down order, and assign to each a polynomial $f_i(x)$ of degree $t_i-1$, where $t_i$ is the threshold of the gate at node i, under the constraints:
 (a) For i=0, we require that $f_0(0)=1$.
 (b) For i>N, we require that $f_i(0)=f_{parent}(i)$ ($f_{parent}$ is the previously defined polynomial given to the parent node of i).
3. Assign to each leaf node i=1, ..., N, the constant $f_i=f_{parent}(i)$.
4. For each i=1, ..., N, extract an IBE private key ($I_i, R_i, d_i$)←Extract (IBE.Msk$_i$, $I_i$).
5. Output the KP-ABE private key: kpABE.Pvk$_{Id}$=(T, ($I_1, R_1, d_1^{f_1}$), ..., ($I_N, R_N, d_N^{f_N}$)).

We have assumed that all N attribute positions appear in the policy, with one value each. If an attribute is missing, its exponent $f_i$ will be undetermined, and its tuple ($I_i, R_i, d_i^{f_i}$) can be omitted from the private key. Conversely, multiple appearances of an attribute in the policy (with the same or different values) can be accommodated using multiple, independently extracted tuples with their own values of $f_i$.

kpABE.Encrypt (Pub, Id, Msg)

On input the public key, a vector Id=($I_1$, ..., $I_N$) of attribute values $I_i \in F_p$, and a message Msg$\in G_t$:

1. Pick a random exponent $s \in F_p$.
2. $\forall$i=1, ..., N, build an IBE ciphertext Ctx$_i$=($I_i, S_i, c_0, c_i$)←Encrypt (IBE.Pub$_i$, $I_i$, Msg, s).
3. Output the KP-ABE ciphertext (using the common $c_0$=Msg$*v^s$): kpABE.Ctx=(Id, $c_0$, (S1, ..., SN), ($c_1$, ..., $C_N$)).

This description assumes that each attribute takes exactly one value. As with the private key, attributes can be omitted or replicated with multiple values, simply by excluding or including the corresponding IBE ciphertexts in the obvious way.

kpABE.Decrypt (Pub, PvkId, Ctx)

Given the public key, a private key Pvk$_{Id}$, and a ciphertext Ctx, we decrypt using a recursive algorithm that can be viewed as a generic version of Goyal et al. "Attribute-Based Encryption for Fine-Grained Access Control of Encrypted Data."

For a node i, we define the Boolean function $T_i(I_1, ..., I_N)$ to be the output value of the gate at node i, when the inputs to the leaves of T are the attribute values $I_1, ..., I_N$.

We first define the recursive function DecryptNode (i):

1. If $T_i(I_1, ..., I_N)$=false, then return $v_i \leftarrow \perp$.
2. If i is a leaf node, i.e., $1 \leq i \leq N$, then:
 (a) Parse Pvk$_i$=($I_i, R_i, d_i$) from Pvk$_{Id}$.
 (b) Build Ctx$_i$=($I_i, 1, S_i, c_i$) from Ctx. Note the "1."
 (c) Return $v_i \leftarrow$ IBE.Decrypt (IBE.Pub$_i$, Pvk$_i$, Ctx$_i$).
3. If i is an interior node with a t-out-of-n threshold gate, then:
 (a) Gather a set of t children, J={$i_1, ..., i_t$}, such that $\forall j \in J$, $T_j(I_1, ..., I_N)$=true. Such a set J must exist since $T_i(I_1, ..., I_N)$=true.
 (b) Let $\Lambda_{J,j}(x)=\Pi_{j' \in J\setminus(j)}(x-j')/(j-j')$ be the Lagrange interpolation coefficients from J to x.
 (c) For each $j \in J$, compute $v_j \leftarrow$ DecryptNode (j). We must get all $v_j \neq \perp$.
 (d) Return $v_i \leftarrow \Pi_{j \in J}(v_j)^{\Lambda(J,j)(0)}$.

We then decrypt by outputting Msg←DecryptNode (0).

The construction differs from the KP-ABE scheme of Goyal et al. "Attribute-Based Encryption for Fine-Grained Access Control of Encrypted Data" in the commutative blinding framework in that the "polynomial algebra in the exponent" is applied on the generic private keys from the underlying IBE systems. The result is a semi-generic construction that can be instantiated with any Exponent Inversion compliant IBE scheme.

Multiple Independent Key Generators

Our generic construction immediately generalizes to the case of multiple independent key generators, which can be useful in many applications. For example, when using fuzzy IBE for encrypting under someone's biometric readings, one may wish to use one set of attributes constructed from fingerprints and another from iris scans, and require a combination of both to decrypt. It is quite possible in this scenario that the authority issuing fingerprint-based private keys would be different than the one issuing keys based on iris scans.

Depending on the nature of the underlying IBE system, it is possible to base our generic fuzzy IBE construction on independent subsystems that share only the bilinear groups and generators, thereby facilitating their setup. Whether independent setup is allowed (in a commonly agreed upon bilinear group), depends on the use that the IBE.Setup function makes of the common random w. For instance, since the BB$_2$ and SK schemes achieve our notion of parallel simulation security without using w, they are suitable for building a multi-authority system without shared secret.

The only remaining difficulty lies in the final assembly of private keys given to the users, because the separate authorities will have to agree on a suitable random polynomial f(x) in order to create a new key. Some amount of coordination between the servers will be required (possibly mediated by the key recipient), but since the polynomial to be agreed upon is ephemeral and decoupled from the master keys, this is an orthogonal problem that can be solved in many standard ways. In particular, Chase in "Multi-Authority Attribute Based Encryption" showed how to construct a multi-authority attribute-based scheme, in the commutative blinding framework, where multiple authorities can vouch for separate attributes under the auspices of a central authority that handles the sharing of ephemerals.

We have shown that the family of identity-based encryption schemes based on the exponent inversion principle can be leveraged into building more powerful systems. We first presented an abstraction to capture a number of useful properties shared by such schemes. We then showed how to use this abstraction to construct generalizations of IBE. We have described hierarchical and fuzzy IBE as concrete examples, as each of them illustrates a specific feature of exponent inversion schemes, but many other generalizations are possible based on the same abstraction. Our approach is fairly lightweight and is also compatible with decentralized authorities.

These results have practical implications, since the few known exponent inversion IBE schemes tend to be marginally more efficient than competing constructions, although they require stronger complexity assumptions. Our formalism has no effect on these benefits and drawbacks, but it extends the range of applicability of the relevant schemes.

We now present examples of IBE extensions.

A diagram of an illustrative system environment in which a hierarchical identity-based-encryption (HIBE) extension to an identity-based encryption scheme may be implemented is shown in FIG. 1. As shown in FIG. 1, system 10 may include a master private key generator 12. Master private key generator 12 may be used to run the functions HIBE.Setup and HIBE.Extract. During HIBE.Setup, a master key pair may be generated that includes the HIBE master key HIBE.Msk and the HIBE public parameters HIBE.Pub. A sender 14 may encrypt and send a message to a recipient such as recipient 16 or recipient 26 over communications network 18. There may, in general, be any suitable number of senders and recipients in system 10. A single sender and two illustrative recipients are shown in the FIG. 1 example.

Communications network 18 may include any suitable local area networks and wide area networks such as the Internet. Master private key generator 12, sender 14, recipients 16 and 26, and other entities in system 10 (and the other systems described herein) have associated computing equipment. The computing equipment may include personal computers, cellular telephones, handheld computers, mainframe computers, combinations of one or more of these devices, or any other suitable computing equipment.

Master private key generator 12 may generate private keys. As shown schematically by lines 28, there may be parent-child relationships in system 10. For example, master private key generator 12 may have children such as child 20 and child 24 that each derives HIBE private keys from a corresponding private key that is produced by master private key generator 12. Private key derivation operations may be performed using the HIBE.Derive function. This scheme may be repeated to create multiple levels of child entities. For example, grandchild system 22 may be a child of child 20 and a grandchild of master private key generator 12. Grandchild system 22 may use the HIBE.Derive function to generate private keys based on a private key provided to system 22 from child system 20.

Each entity that derives private keys in system 10 may provide those private keys to its associated users. For example, child system 24 may use the HIBE.Derive function to provide private keys for its associated users such as recipient 26. Grandchild system 22 may use the HIBE.Derive function to provide private keys for its associated users such as recipient 16. Sender 14 encrypts plaintext messages into ciphertext using encrypt function HIBE.Encrypt and a public key corresponding to a given recipient's private key. Recipients can use the private keys to decrypt encrypted messages (also called ciphertext) using function HIBE.Decrypt.

Figure 2:
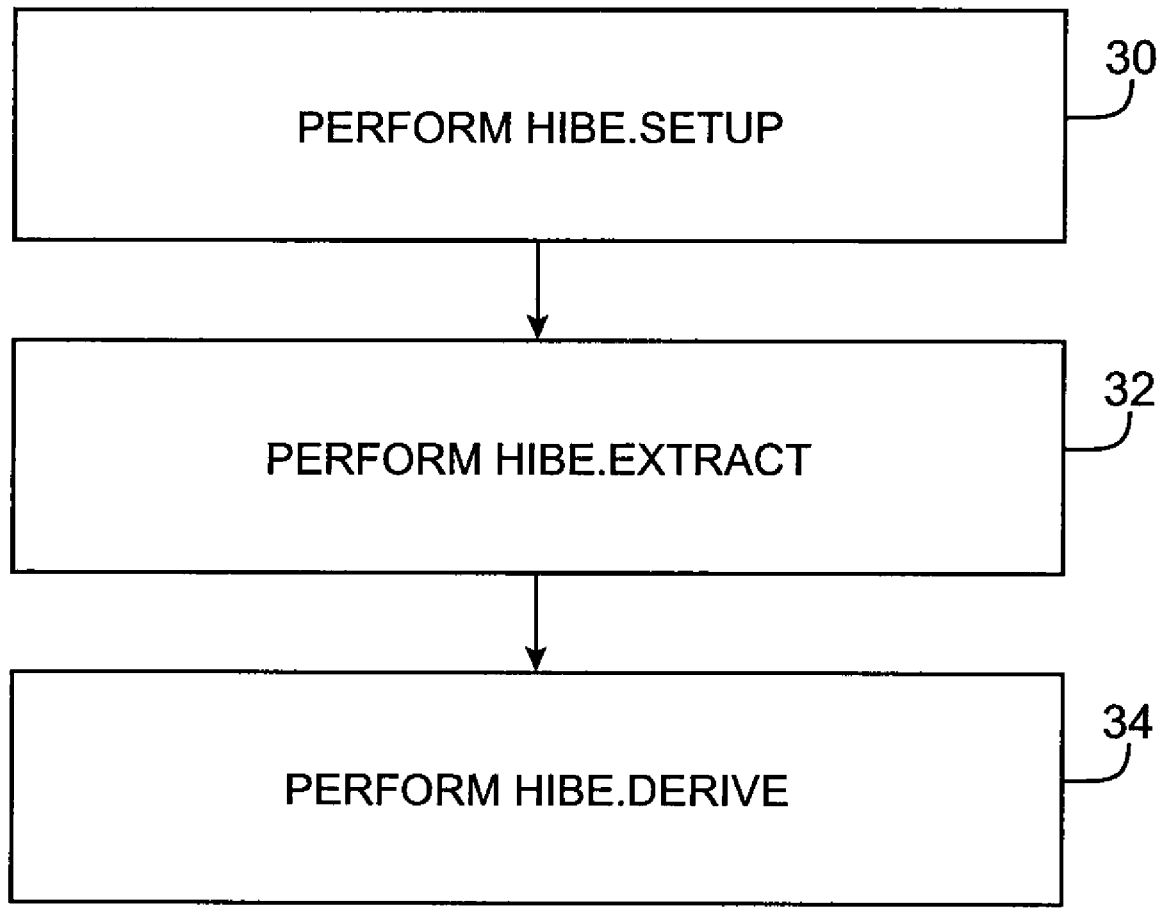
FIG. 2 is a flow chart of illustrative steps involved in setting up a system of the type shown in FIG. 1 for performing hierarchical identity-based encryption operations with an implementation of a hierarchical identity-based-encryption extension in accordance with an embodiment of the present invention.

Illustrative steps involved in setting up a system of the type shown in FIG. 1 so as to support the operations of a hierarchical identity-based encryption extension to an identity-based encryption scheme are shown in FIG. 2.

At step 30, setup operations for implementing the hierarchical IBE extension to the IBE scheme are performed. For example, master private key generator 12 may run the function HIBE. During step 30, the master private key generator produces an HIBE master key pair.

At step 32, private keys are generated by the master private key generator using function HIBE.Extract. During step 32, the master private key generator creates an HIBE private key for a requesting entity. The HIBE.Extract function may be performed whenever a private key is needed (e.g., whenever requested by an authorized entity in the system such as a child, grandchild, etc.).

At step 34, function HIBE.Derive is used by other systems (e.g., child system 20, child system 24, and grandchild system 22 in the FIG. 1 example) to derive associated private keys from the private keys that were produced by the master private key generator 12. Keys may be derived in advance and distributed to associated users (e.g., to cache on their local machines) or may be generated in real time in response to valid private key requests from the users associated with each system.

After system 10 has been set up, senders may encrypt plaintext messages (Msg) to produce ciphertext (encrypted) messages. Encryption operations use identity-based public keys (e.g., keys based on an email address or other public identity information associated with a recipient).

Figure 3:
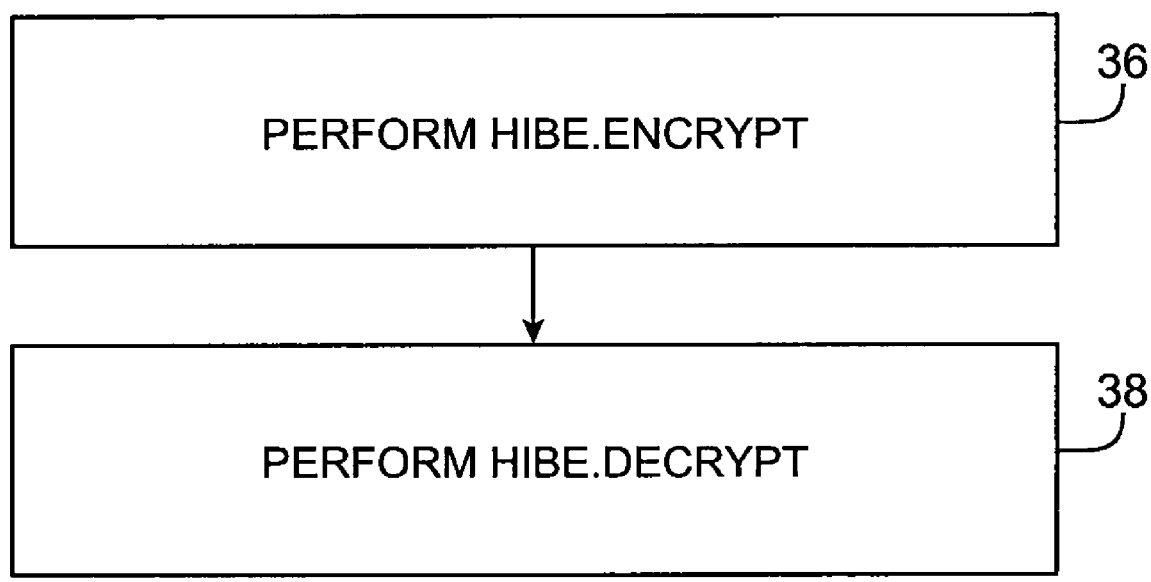
FIG. 3 is a flow chart of illustrative steps involved in using a system of the type shown in FIG. 1 for performing hierarchical identity-based encryption operations with an implementation of a hierarchical identity-based-encryption extension in accordance with an embodiment of the present invention.

Illustrative steps involved in using a system of the type shown in FIG. 1 to convey secure messages between a sender and a recipient over communications network 18 are shown in FIG. 3.

At step 36, sender 14 may encrypt a message using the encryption function HIBE.Encrypt. The encrypted message may then be sent to a recipient such as recipient 16 or recipient 26 of FIG. 1 over network 18. The recipient receives the encrypted message (ciphertext) and decrypts the encrypted message using a decryption function such as HIBE.Decrypt (step 38).

Figure 4:
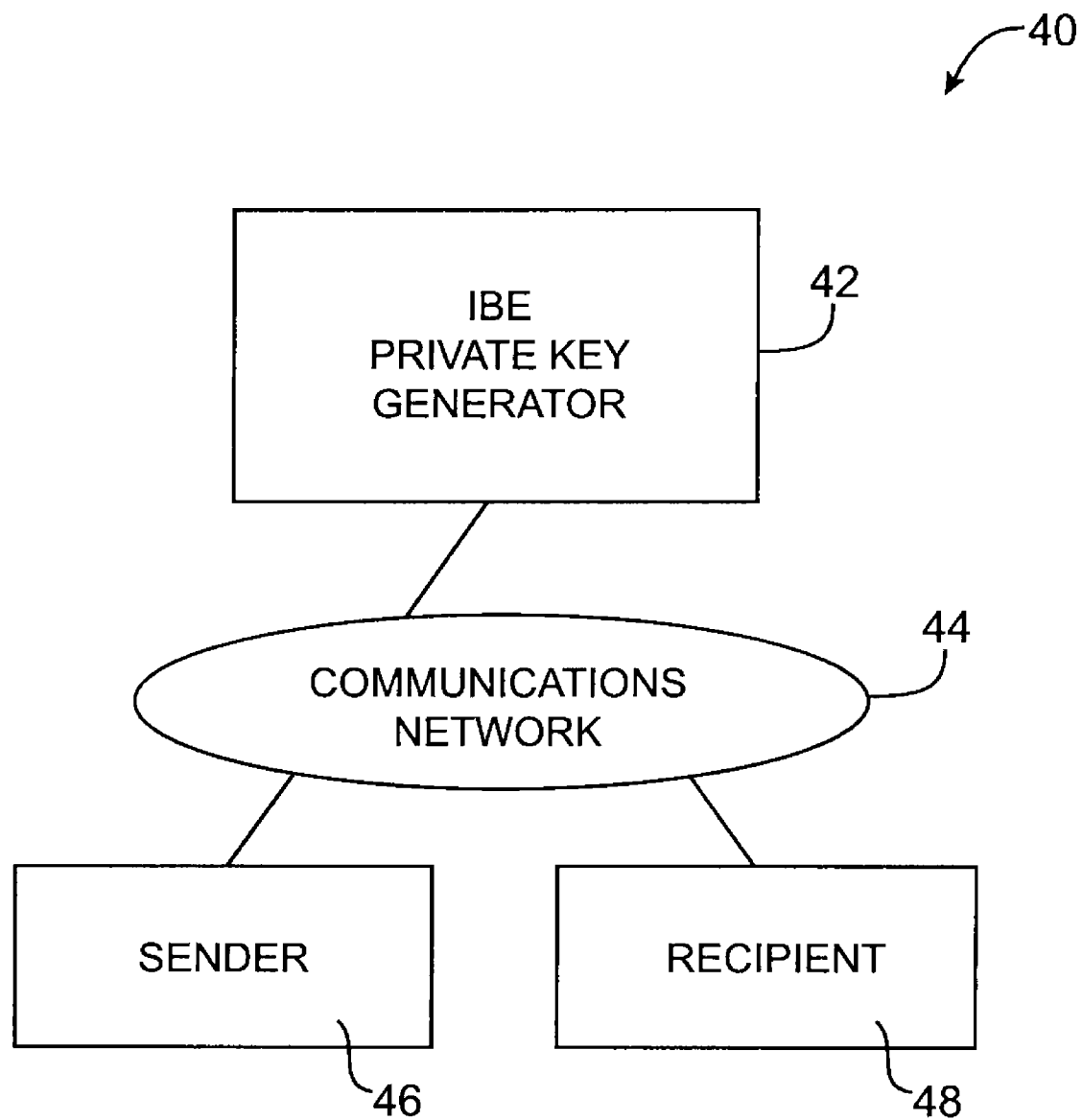
FIG. 4 is a schematic diagram of an illustrative system environment in which fuzzy and attribute-based identity-based-encryption extensions to an identity-based encryption scheme may be implemented in accordance with an embodiment of the present invention.

A system 40 in which a fuzzy identity-based-encryption extension to an identity-based encryption scheme may be implemented is shown in FIG. 4. In system 40, IBE private key generator 42 may be used to generate IBE private keys. A sender 46 may encrypt a message for a recipient 48 using an identity-based public key (and using IBE public parameters). The encrypted message may be sent to the recipient over communications network 44. The recipient 48 may decrypt the encrypted message using the recipient's private key. Unlike conventional IBE systems, where each user's identity is indivisible, identities in an implementation of a fuzzy IBE extension are constructed from multiple attributes $I_1, \ldots, I_N$.

Figure 5:
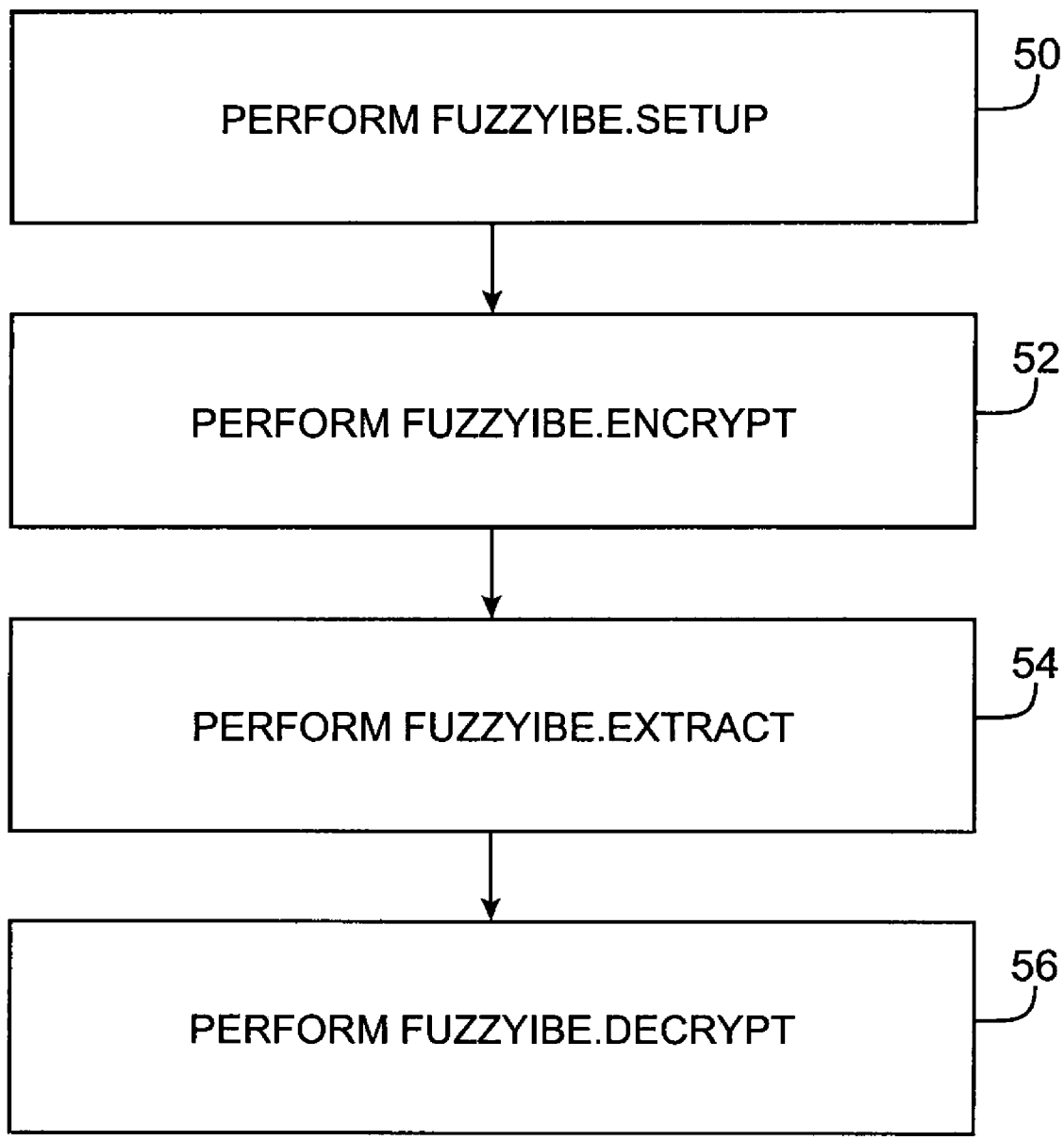
FIG. 5 is a flow chart of illustrative steps involved in using a fuzzy identity-based-encryption extension of an identity-based encryption scheme in accordance with an embodiment of the present invention.

FIG. 5 is a flow chart of illustrative steps involved in using a fuzzy identity-based-encryption extension of an identity-based encryption scheme.

At step 50, an IBE private key generator such as IBE private key generator 42 of FIG. 4 may run the function FUZZY-IBE.Setup. This generates a fuzzy IBE master secret and fuzzy IBE public parameters.

At step 52, a sender who desires to send a secure message may encrypt the message by running the function FUZZY- IBE.Encrypt. The encrypted message may then be sent from the sender 46 to the recipient 48 over network 44.

To decrypt the message, the recipient obtains a private key from private key generator 42. Private key generator 42 may generate the private key by performing the operations of the function FUZZYIBE.Extract (step 54). Private keys can be produced in response to valid private key requests from users. Users may, if desired, locally cache their private keys. When private keys are locally cached in this way, the frequency with which private keys are requested from the private key generator may be reduced. The private key generation operations of step 54 therefore need not be performed just prior to decryption. For example, the private key generation operations of step 54 may be performed between steps 50 and 52.

After the recipient has received the encrypted message and has obtained the private key, the encrypted message may be decrypted at the recipient by running the function FUZZY-IBE.Decrypt (step 56).

Figure 6:
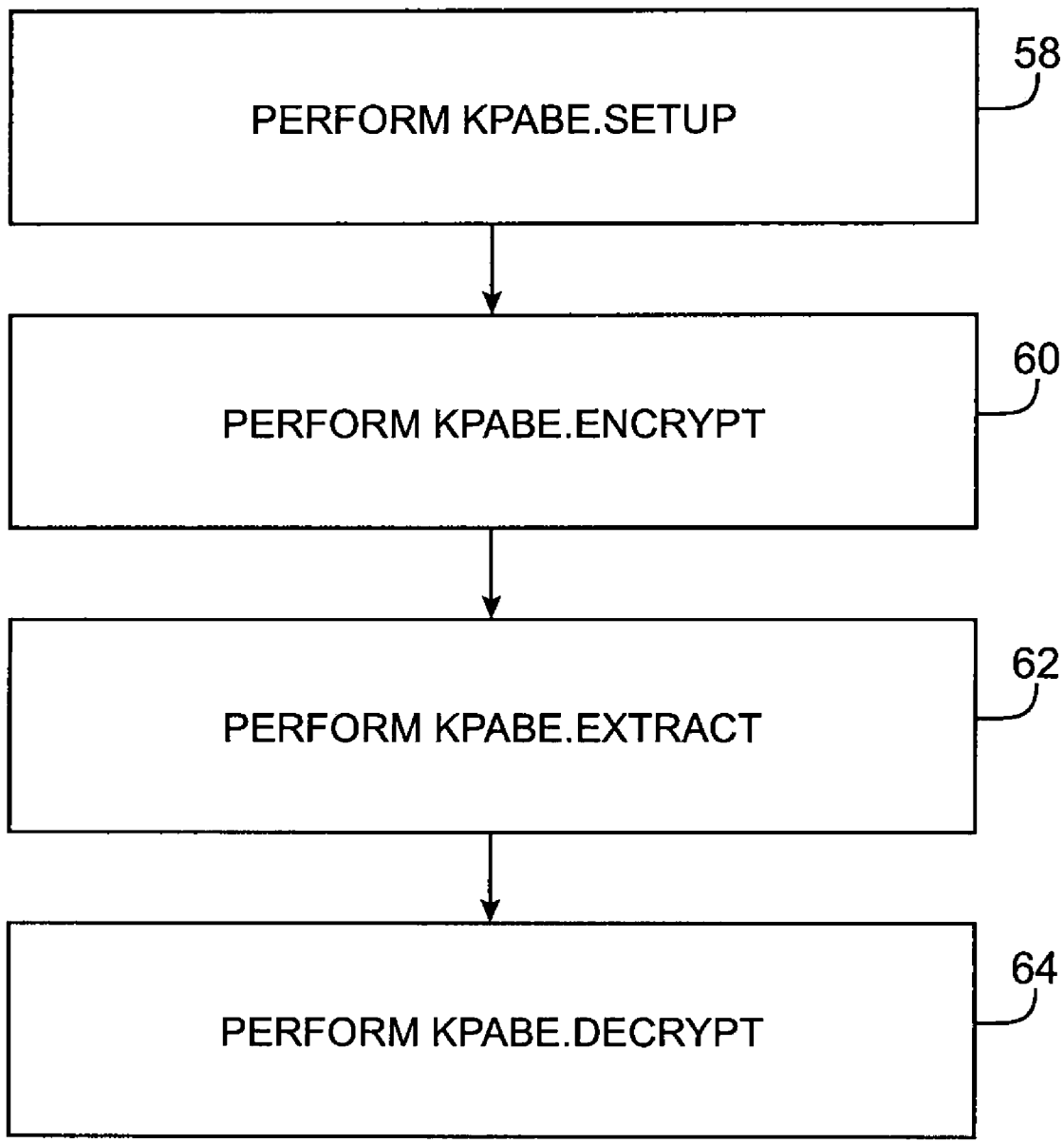
FIG. 6 is a flow chart of illustrative steps involved in using an attribute-based identity-based- encryption extension of an identity-based encryption scheme in accordance with an embodiment of the present invention.

A flow chart of illustrative steps involved in using an attribute-based identity-based-encryption extension of an identity-based encryption scheme that is implemented on a system such as system 40 of FIG. 4 is shown in FIG. 6. As with the fuzzy IBE arrangement, the attribute-based extension of FIG. 6 uses identities that are constructed from constituent parts. The difference between the fuzzy IBE extension and the attribute-based IBE extension is that in the fuzzy arrangement a certain number of attributes must match between the public key and the private key (e.g., t out of n), whereas with the attribute-based extension more complex attribute matching policies may be implemented. As an example, in the attribute-based extension it may be required that three out of a first five attributes must match and that one out of a subsequent six attributes must match between a public key and a private key before decryption is permitted.

With the attribute-based extension, private key generator 42 may be used to perform the operations of the function KPAB.Setup (step 58). This generates an IBE master secret and IBE public parameters for the attribute-based IBE extension.

At step 60, a sender who desires to send a secure message may encrypt the message by running the function KPABE.Encrypt. The encrypted message may then be sent from the sender 46 to the recipient 48 over network 44.

To decrypt the message, the recipient must obtain a private key from private key generator 42. Private key generator 42 may generate the private key by performing the operations of the function KPABE.Extract (step 62). Private keys can be produced by KPABE.Extract in response to a private key request from a user. Users may request a private key when needed or in advance (e.g., when locally caching their private keys). Accordingly, the function KPABE.Extract may, if desired, be run between steps 58 and 60.

After the recipient has received the encrypted message and has obtained the private key, the encrypted message may be decrypted at the recipient by running the function KPABE.Decrypt (step 64).

Techniques for generating and using IBE extensions for any suitable IBE scheme are described in connection with FIGS. 7-11.

Figure 7:
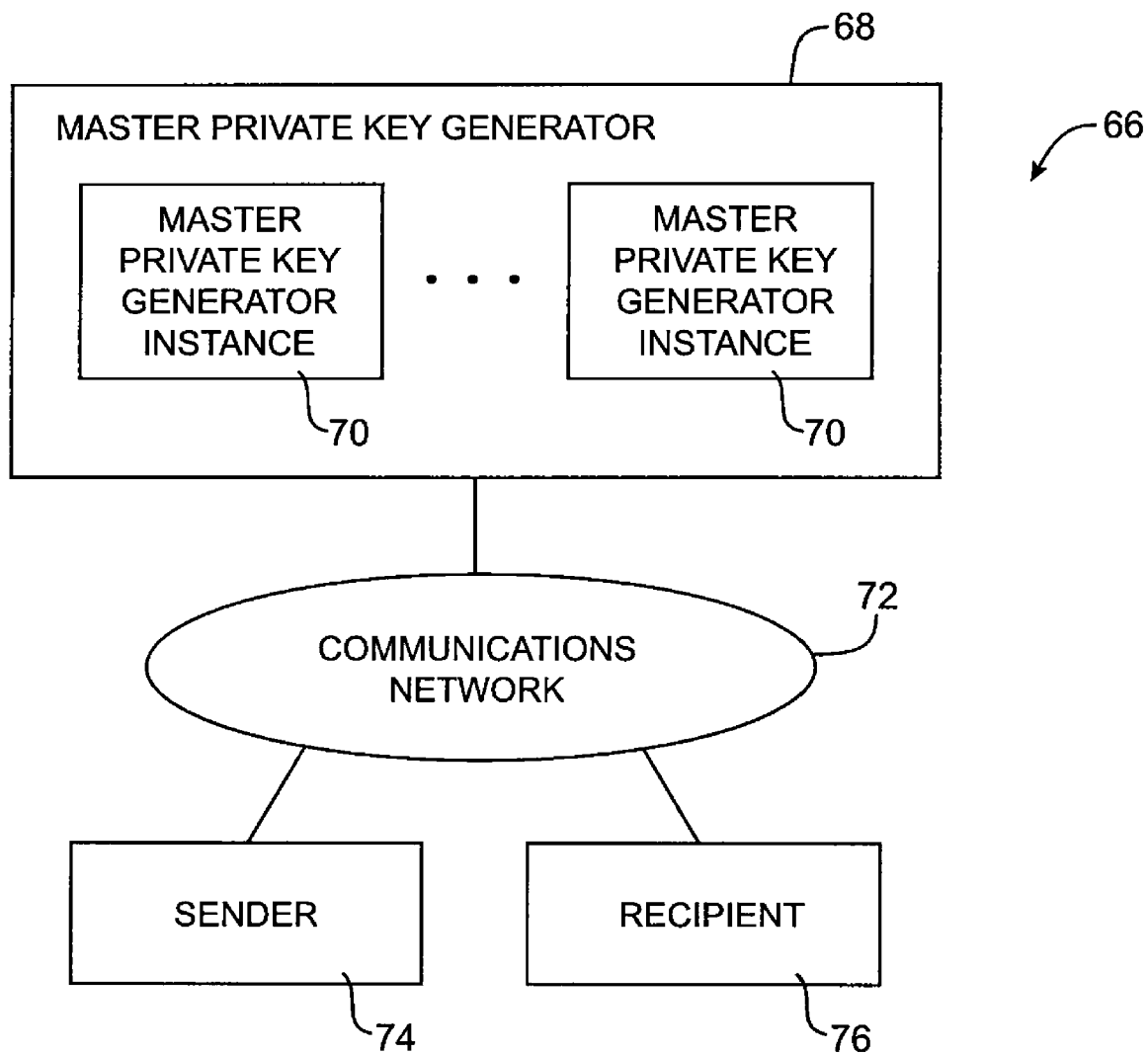
FIG. 7 is a schematic diagram of an illustrative system environment in which identity-based-encryption extensions to an identity-based encryption scheme may be implemented in accordance with an embodiment of the present invention.

FIG. 7 is a schematic diagram of an illustrative system 66 in which identity-based-encryption extensions to identity-based encryption schemes may be implemented. As shown in FIG. 7, a sender 74 may desire to send a secure message to a recipient 76 over a communications network 72. Any suitable type of message may be conveyed between senders such as sender 74 and recipient 76. For example, email messages, instant messages, and other messages may be conveyed. Network 72 may include any suitable number of local and wide area networks. For example, network 72 may include the internet.

Master private key generator 68 is used to create multiple separate instances 70 of the same IBE scheme, each having a different associated master key and a different associated set of IBE public parameters. During encryption operations, a sender divides an identity ID into multiple components and uses each of these components to encrypt a message. During private key generation operations, private key generator 68 also divides the identity ID into its constituent components. The extracted components are then used by the extract function implemented at the private key generator.

Figure 8:
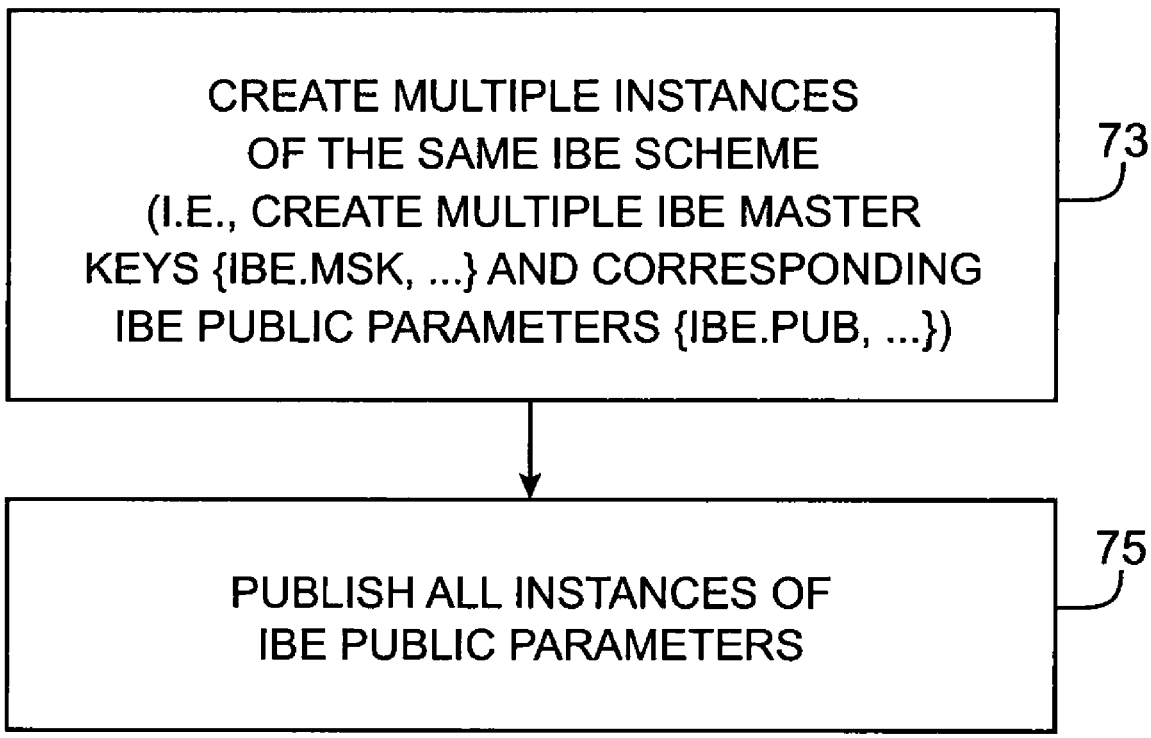
FIG. 8 is a flow chart of illustrative steps involved in setting up an identity-based-encryption extension to an identity-based-encryption scheme implemented in a system of the type shown in FIG. 7 in accordance with an embodiment of the present invention.

FIG. 8 is a flow chart of illustrative steps involved in setting up an identity-based-encryption extension to an identity-based-encryption scheme implemented in a system of the type shown in FIG. 7 in accordance with an embodiment of the present invention.

At step 73, setup operations are performed for the IBE extension by creating multiple instances 70 of the same IBE scheme for master private key generator 68. Each instance has an associated IBE master key $\{IBE.MSK_1, \ldots\}$ and corresponding IBE public parameters $\{IBE.PUB_1, \ldots\}$.

At step 75, all instances of the IBE public parameters that are generated at step 72 are published. Any suitable publication technique may be used (e.g., distributing the public parameters in messages, placing the public parameters in a directory or other publicly-available network location, incorporating the public parameters into software, etc.). After step 75, senders can encrypt messages for recipients using identity-based public keys of the recipients. Recipients can use corresponding private keys to decrypt the encrypted (ciphertext) messages.

Figure 9:
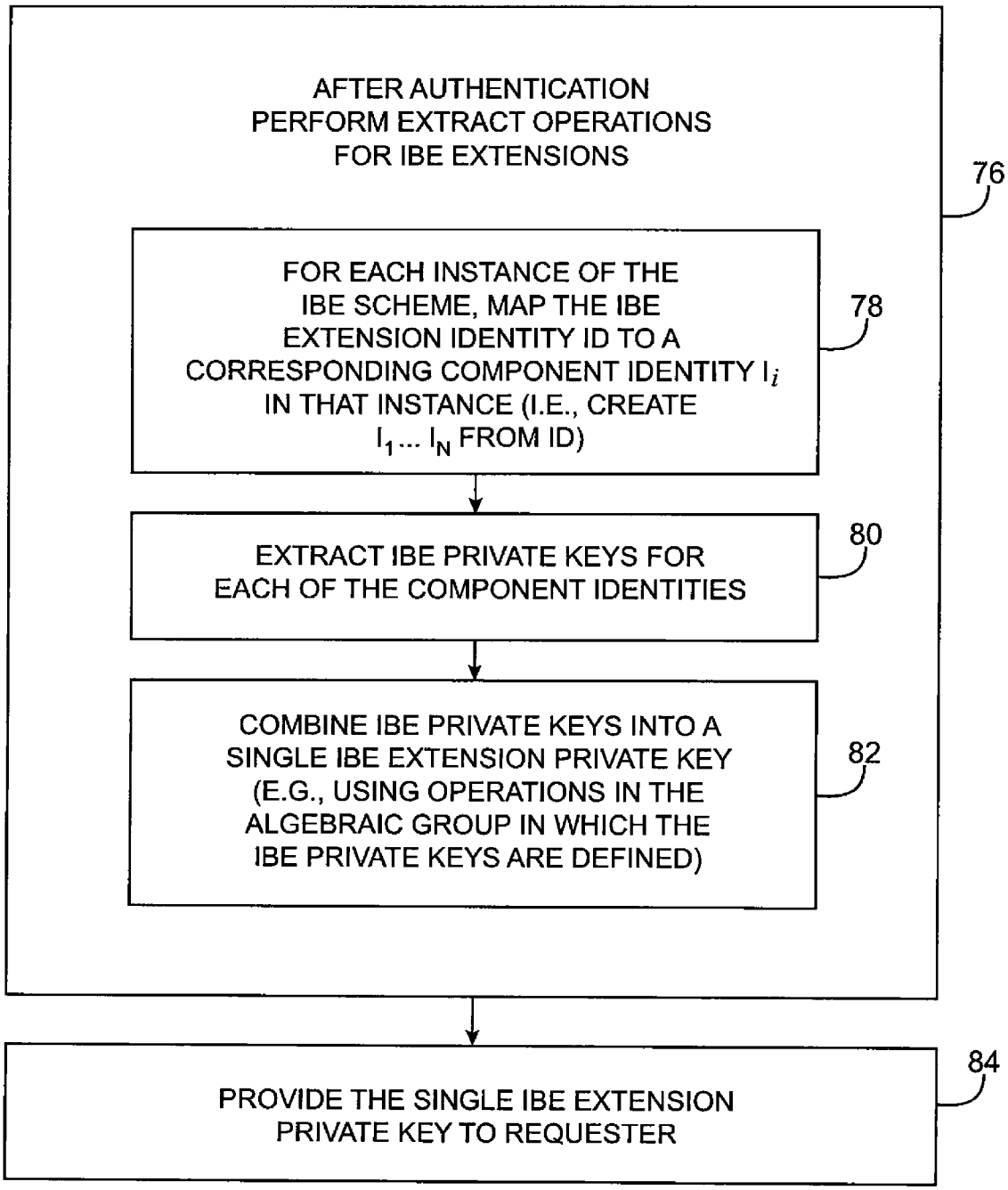
FIG. 9 is a flow chart of illustrative steps involved in generating identity-based-encryption private keys in an identity-based-encryption extension to an identity-based-encryption scheme implemented in a system of the type shown in FIG. 7 in accordance with an embodiment of the present invention.

Illustrative steps involved in generating private keys are shown in FIG. 9. At step 76, after authenticating a user that is requesting a key, private key generator 68 performs extract operations for the IBE extension of the IBE scheme.

For each instance 70 of the IBE scheme, the private key generator 68 maps the IBE extension identity ID to a corresponding component identity $I_i$ in that instance, thereby creating component identities $I_1 \ldots I_N$ from ID (step 78).

At step 80, IBE private keys are generated for each of the component identities (i.e., using an extract function).

At step 82, the IBE private keys that were generated during step 80 are combined into a single IBE extension private key (e.g., using operations in the algebraic group in which the IBE private keys are defined such as multiplication of group elements and/or exponentiation to integer powers).

At step 84, the single IBE extension private key is provided to the key requester (e.g., recipient 76).

Figure 10:
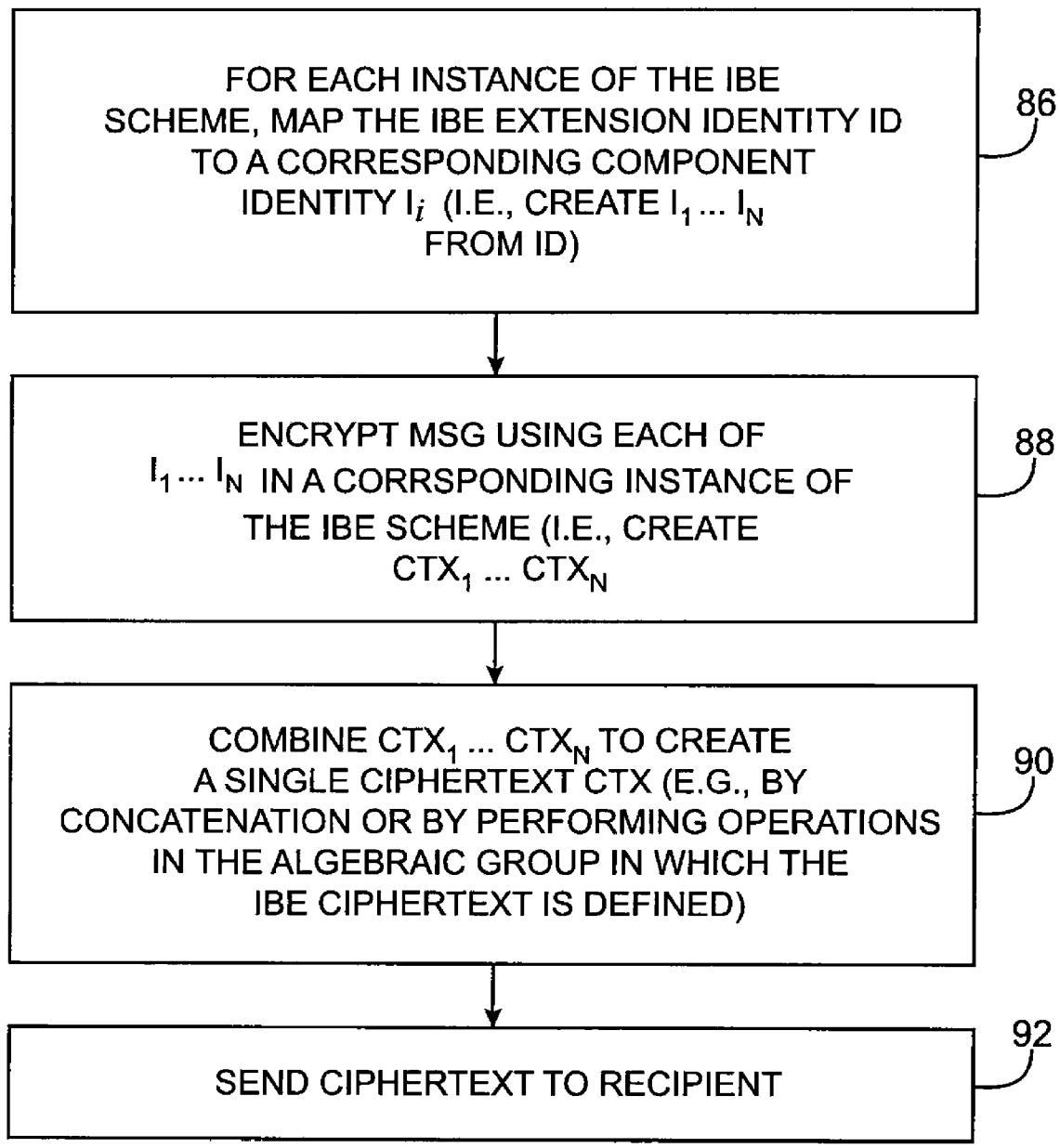
FIG. 10 is a flow chart of illustrative steps involved in performing encryption operations with an identity-based-encryption extension to an identity-based-encryption scheme implemented in a system of the type shown in FIG. 7 in accordance with an embodiment of the present invention.

FIG. 10 is a flow chart of illustrative steps involved in performing encryption operations with an identity-based-encryption extension to an identity-based-encryption scheme implemented in system 66 of FIG. 7. The encryption operations of FIG. 10 may be performed using the computing equipment of sender 74 (e.g., using an encrypt function at the sender).

At step 86, for each instance 70 of the IBE scheme, the IBE extension identity ID is mapped to a corresponding component identity.

At step 88, a plaintext message MSG is encrypted. During the encryption operations of step 88, the message is encrypted using each component identity in a corresponding instance 70 of the IBE scheme. This creates respective ciphertexts $CTX_1, \ldots, CTX_N$ for each component identity.

At step 90, the ciphertexts $CTX_1, \ldots, CTX_N$ that correspond to the component identities are combined to create a single ciphertext CTX. For example, the ciphertexts $CTX_1, \ldots, CTX_N$ can be combined by performing concatenation operations or by performing operations in the algebraic group in which the IBE ciphertext is defined.

At step 92, the ciphertext CTX may be sent from sender 74 to recipient 76.

Figure 11:
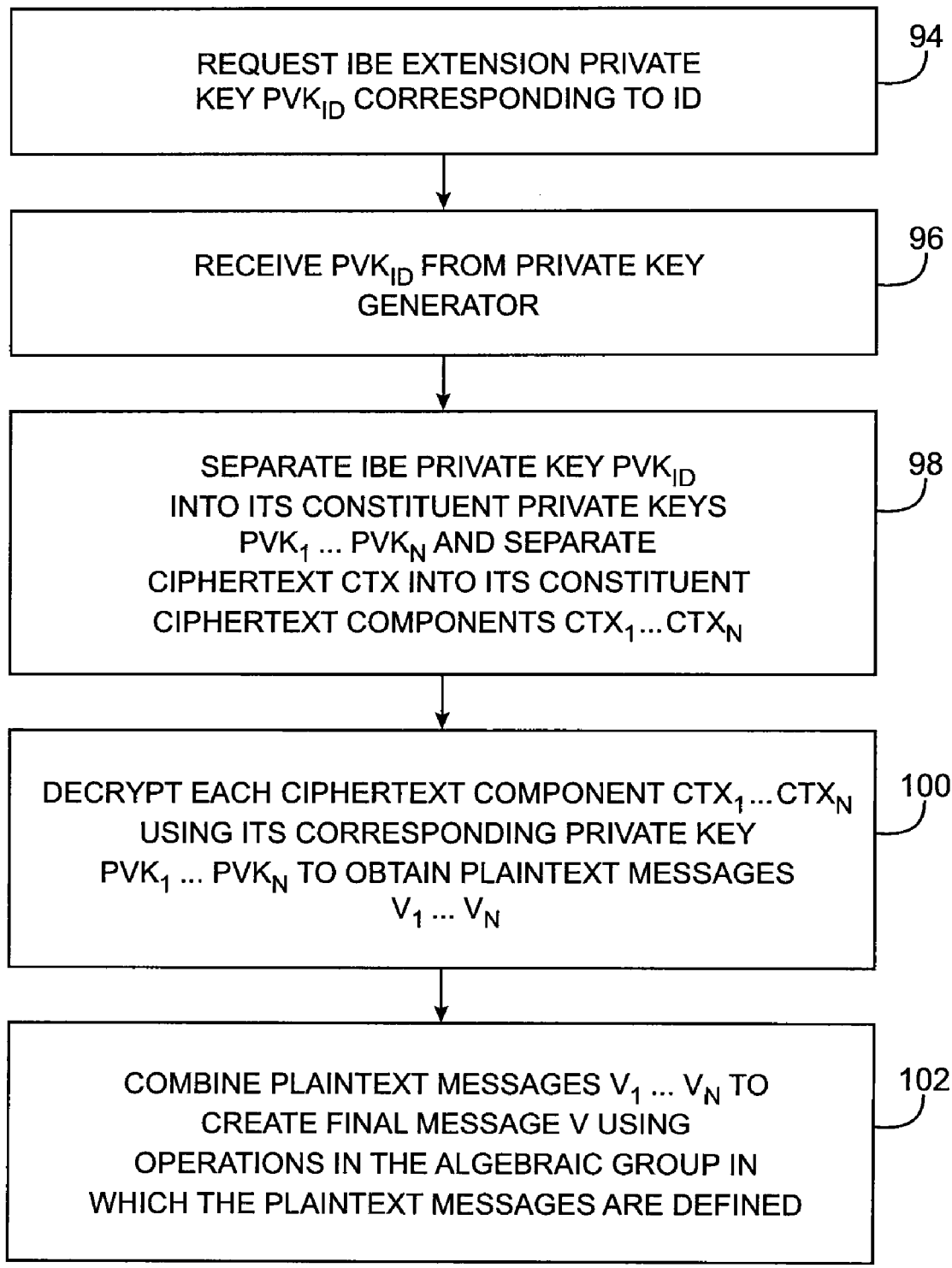
FIG. 11 is a flow chart of illustrative steps involved in performing decryption operations with an identity-based-encryption extension to an identity-based-encryption scheme implemented in a system of the type shown in FIG. 7 in accordance with an embodiment of the present invention.

A flow chart of illustrative steps involved in performing decryption operations with an identity-based-encryption extension to an identity-based-encryption scheme implemented in system 66 of FIG. 7 is shown in FIG. 11. The decryption operations of FIG. 11 may be performed using a decryption function running on the computing equipment of recipient 76 after the recipient has received ciphertext CTX over network 72.

At step 94, an IBE extension private key $PVK_{ID}$ corresponding to IBE extension identity ID may be requested from private key generator 68 over communications network 72.

At step 96, private key $PVK_{ID}$ may be received by recipient 76 from private key generator 68 over communications network 72.

At step 98, IBE private key $PVK_{ID}$ is separated into its constituent private keys $PVK_1, \ldots PVK_N$ and ciphertext CTX is separated into its constituent ciphertext components $CTX_1, \ldots CTX_N$.

At step 100, each ciphertext component $CTX_1, \ldots CTX_N$ is decrypted using its corresponding private key $PVK_1, \ldots, PVK_N$ to obtain corresponding plaintext messages $V_1, \ldots, V_N$.

At step 102, the plaintext messages $V_1, \ldots, V_N$ may be combined to create final plaintext message V. The plaintext messages may be combined using operations in the algebraic group in which the plaintext messages are defined. The final message V represents an unencrypted version of ciphertext CTX and corresponds to the original unencrypted message MSG sent by the sender.

The foregoing is merely illustrative of the principles of this invention and various modifications can be made by those skilled in the art without departing from the scope and spirit of the invention.

What is claimed is:

1. A method for using multiple instances of an identical identity-based-encryption (IBE) scheme in an IBE extension to the IBE scheme to communicate securely over a communications network, comprising:
   at computing equipment of a sender, creating multiple component identities from an IBE extension identity by mapping the IBE extension identity to a corresponding component identity for each instance of the IBE scheme;
   at the computing equipment of the sender, encrypting a message by using the component identities in corresponding instances of the identical IBE scheme to create a corresponding set of ciphertexts;
   combining the ciphertexts to create a single ciphertext corresponding to the message;
   sending the single ciphertext to a recipient over the communications network;
   at computing equipment of the recipient, receiving the single ciphertext;
   requesting an IBE extension private key corresponding to the IBE extension identity; and
   receiving an IBE private key from a private key generator and, at the recipient, separating the IBE private key into a plurality of constituent IBE private keys each corresponding to one of the instances of the IBE scheme.

2. The method defined in claim 1 further comprising, at the recipient: separating the single ciphertext into a plurality of constituent ciphertext components.

3. The method defined in claim 2 further comprising, at the recipient:
   decrypting each constituent ciphertext component using a corresponding one of the constituent private keys to obtain a plurality of corresponding plaintext messages.

4. The method defined in claim 3 further comprising, at the recipient:
   combining the plaintext messages to produce an unencrypted version of the message sent by the sender.

5. The method defined in claim 1 wherein the IBE extension comprises an IBE extension selected from the group consisting of: a hierarchical IBE extension, a fuzzy IBE extension, and an attribute-based IBE extension.

6. The method defined in claim 1 wherein the IBE scheme comprises a pairing-based IBE scheme.

7. The method defined in claim 1 wherein the IBE scheme comprises an exponent inversion IBE scheme.

8. A method with which an identity-based-encryption (IBE) extension to an IBE scheme is implemented, comprising:
   at computing equipment of a master IBE private key generator, creating multiple instances of the same IBE scheme, wherein each instance has a corresponding IBE master key and corresponding IBE public parameters;
   creating multiple component identities from an IBE extension identity by mapping the IBE extension identity to a corresponding component identity for each instance of the IBE scheme;
   creating multiple IBE private keys corresponding to the multiple component identities by extracting a corresponding IBE private key for each of the component identities; and
   combining the multiple IBE private keys to form a single IBE extension private key.

9. The method defined in claim 8 further comprising publishing the IBE public parameters for all of the instances of the IBE scheme.

10. The method defined in claim 8 wherein the IBE extension comprises an IBE extension selected from the group consisting of: a hierarchical IBE extension, a fuzzy IBE extension, and an attribute-based IBE extension.

11. The method defined in claim 8 wherein the IBE scheme comprises a pairing-based IBE scheme selected from the group consisting of: a full-domain hash IBE scheme, an exponent inversion IBE scheme, and a commutative blinding IBE scheme.

12. The method defined in claim 8 wherein the IBE scheme comprises a pairing-based IBE scheme.

13. The method defined in claim 8 wherein the IBE scheme comprises an exponent inversion IBE scheme.

* * * * *